US011628606B2

(12) United States Patent
Yeh et al.

(10) Patent No.: US 11,628,606 B2
(45) Date of Patent: Apr. 18, 2023

(54) INJECTION MOLDING METHOD

(71) Applicant: KING STEEL MACHINERY CO., LTD., Taichung (TW)

(72) Inventors: Liang-Hui Yeh, Taichung (TW); Ching-Hao Chen, Taichung (TW)

(73) Assignee: KING STEEL MACHINERY CO., LTD., Taichung (TW)

( * ) Notice: Subject to any disclaimer, the term of this patent is extended or adjusted under 35 U.S.C. 154(b) by 0 days.

(21) Appl. No.: 17/547,744

(22) Filed: Dec. 10, 2021

(65) Prior Publication Data

US 2022/0097270 A1 Mar. 31, 2022

Related U.S. Application Data

(62) Division of application No. 16/857,092, filed on Apr. 23, 2020, now Pat. No. 11,267,175.

(60) Provisional application No. 62/950,454, filed on Dec. 19, 2019, provisional application No. 62/915,287, filed on Oct. 15, 2019.

(51) Int. Cl.
*B29C 45/30* (2006.01)
*B29C 45/27* (2006.01)
*B29C 45/77* (2006.01)

(52) U.S. Cl.
CPC .......... *B29C 45/30* (2013.01); *B29C 45/2737* (2013.01); *B29C 45/77* (2013.01)

(58) Field of Classification Search
CPC ..... B29C 45/30; B29C 45/2737; B29C 45/77; B29C 45/13; B29C 31/042
See application file for complete search history.

(56) References Cited

U.S. PATENT DOCUMENTS 3,827,841 A 8/1974 Kawai et al.
3,871,806 A * 3/1975 Leunig ................. B29C 44/427
425/572

(Continued)

FOREIGN PATENT DOCUMENTS

EP 0799853 A1 10/1997
EP 3789176 A1 3/2021

(Continued)

OTHER PUBLICATIONS

Extended Search Report dated Mar. 1, 2021 issued by the European Patent Office for the European patent application No. 20201848.7-1017.

(Continued)

*Primary Examiner* — Kelly M Gambetta
*Assistant Examiner* — Virak Nguon
(74) *Attorney, Agent, or Firm* — WPAT Law; Anthony King

(57) ABSTRACT

An injection-molding method includes providing an extruding system configured to produce a mixture, a first discharging channel including a first outlet, a second discharging channel including a second outlet, and a molding device including a space and first and second feeding ports communicable with the space and respectively engageable with the first and second outlets; engaging the first outlet with the first feeding port; engaging the second outlet with the second feeding port; injecting the mixture through the first outlet and the first feeding port; and injecting the mixture through the second outlet and the second feeding port.

20 Claims, 27 Drawing Sheets

(56) References Cited

U.S. PATENT DOCUMENTS

| | | | |
|---|---|---|---|
| 3,891,362 A | 6/1975 | Devita | |
| 4,250,132 A | 2/1981 | Beach | |
| 4,699,581 A * | 10/1987 | Nagasaka | B29C 45/5008 |
| | | | 425/574 |
| 5,997,781 A * | 12/1999 | Nishikawa | C08J 9/122 |
| | | | 264/52 |
| 2012/0196115 A1 * | 8/2012 | Choe | B29D 35/142 |
| | | | 428/304.4 |
| 2012/0267815 A1 | 10/2012 | Tokunou | |
| 2017/0291335 A1 * | 10/2017 | Chen | B29C 45/164 |
| 2018/0345546 A1 | 12/2018 | Chen | |
| 2020/0391416 A1 | 12/2020 | Burnham et al. | |

FOREIGN PATENT DOCUMENTS

| | | | | |
|---|---|---|---|---|
| EP | 3808527 A1 | | 4/2021 | |
| EP | 3815870 A1 | | 5/2021 | |
| GB | 2179886 A | | 3/1987 | |
| JP | H01145422 U | | 10/1989 | |
| JP | H0872098 A | | 3/1996 | |
| JP | 2000006198 A | * | 1/2000 | ............ B29C 45/27 |
| JP | 2000015657 A | | 1/2000 | |
| JP | 2000084968 A | | 3/2000 | |
| JP | 2001150504 A | | 6/2001 | |
| JP | 2004066500 A | | 3/2004 | |
| JP | 2010519079 A | | 6/2010 | |
| WO | 2008102224 A | | 8/2008 | |

OTHER PUBLICATIONS

Notice of allowance and Cited References dated Mar. 16, 2022 issued by the Korean Intellectual Property Office for the Korean patent application No. 10-2020-124149.

Office Action, Cited References and Search Report dated May 12, 2022 issued by the China National Intellectual Property Administration for the Chinese counterpart patent application No. 202011099752.X.

Extended Search Report from the European Patent Office of EP patent application No. EP22 172 580.7-1014 dated Oct. 14, 2022.

Notice of allowance from the Korean Intellectual Property Office of KR patent application No. 10-2020-0084116 dated Nov. 2, 2022.

Non-Final Rejection and List of References of U.S. Appl. No. 17/582,798 dated Feb. 2, 2023.

* cited by examiner

INJECTION MOLDING METHOD

CROSS-REFERENCE TO RELATED APPLICATION

This application is a divisional application of a U.S. patent application entitled INJECTION MOLDING SYSTEM, Ser. No. 16/857,092, filed Apr. 23, 2020, which claims priority of U.S. provisional application Ser. No. 62/915,287 filed on Oct. 15, 2019, U.S. provisional application Ser. No. 62/950,454 filed on Dec. 19, 2019.

TECHNICAL FIELD

The present invention is related to an injection-molding system and an injection-molding method, and, in particular, to an injection-molding system and an injection-molding method for making a foamed article.

BACKGROUND

Foamed polymeric material has many advantages, such as high strength, low weight, impact resistance, thermal insulation, and others. Foamed articles can be made by injection molding or extrusion molding. For example, after the polymeric material is melted and mixed with a blowing agent to form a mixture, a force or pressure is applied to the mixture to inject or extrude the mixture into a cavity of a mold, and the mixture is foamed and cooled in the cavity to form the foamed article.

However, it is necessary to improve the properties of the foamed article made by the injection-molding system, such as causing different portions of the foamed article to have different properties. Therefore, there is a need for improvements to structures of the injection-molding system and the method for making foamed articles.

BRIEF SUMMARY OF THE INVENTION

One purpose of the present invention is to provide an injection-molding system and a method of injection molding.

According to one embodiment of the present disclosure, an injection-molding system is disclosed. The injection-molding system includes an extruding system, a plurality of discharging channels and a molding device. The extruding system is configured to produce a mixture of a polymeric material and a blowing agent. Each of the discharging channels is communicable with the extruding system, and each of the discharging channels includes an outlet disposed distal from the extruding system and configured to discharge the mixture. The molding device is configured to receive the mixture from the outlets. The molding device includes a hollow space, and a plurality of feeding ports communicable with the hollow space and correspondingly engageable with the outlets.

According to one embodiment of the present disclosure, a method of injection molding is disclosed. The method of injection molding includes providing an extruding system configured to produce a mixture of a polymeric material and a blowing agent, a first discharging channel, a second discharging channel, and a molding device including a hollow space, a first feeding port and a second feeding port, wherein the first discharging channel is communicable with the extruding system and includes a first outlet disposed distal from the extruding system, the second discharging channel is communicable with the extruding system and includes a second outlet disposed distal from the extruding system, and the first feeding port and the second feeding port are communicable with the hollow space and engageable with the first outlet and the second outlet, respectively. The method of injection molding further includes engaging the first outlet with the first feeding port; engaging the second outlet with the second feeding port; injecting a first amount of the mixture into the hollow space through the first outlet and the first feeding port; and injecting a second amount of the mixture into the hollow space through the second outlet and the second feeding port.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
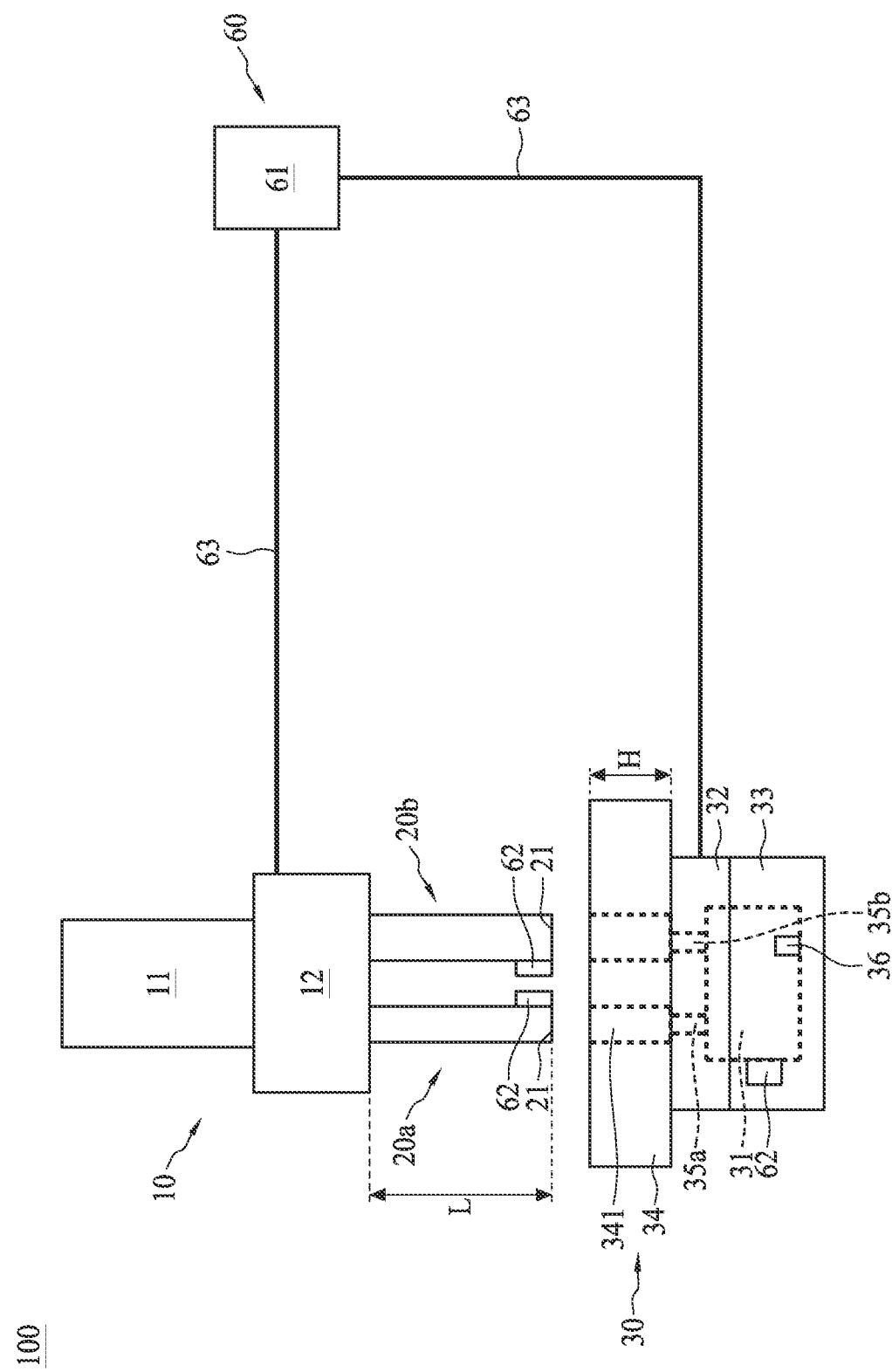
FIG. 1 is a schematic diagram of an injection-molding system according to one embodiment of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a schematic diagram of an injection-molding system 100 according to one embodiment of the present invention. The injection-molding system 100 includes an extruding system 10, a plurality of discharging channels 20a, 20b, and a molding device 30. The extruding system 10 is configured to produce the mixture of a polymeric material and a blowing agent, and configured to inject the mixture into the discharging channels 20a, 20b. The extruding system 10 is connected to or communicable with the discharging channels 20a, 20b. The extruding system 10 includes a mixing barrel 11 and an injection outlet 12. The mixing barrel 11 is configured to mix the polymeric material with the blowing agent to form the mixture, and the injection outlet 12 is configured to extrude the mixture.

In some embodiments, the mixture includes a high molecular weight polymer and a blowing agent. In some embodiments, the blowing agent is a physical or chemical additive that releases gas during the heating process, thereby forming pores in the thus-obtained foamed article. In some embodiments, the blowing agent is a physical additive. In some embodiments, the blowing agent is a supercritical fluid (SM.

In some embodiments, the mixture accumulated at the mixing barrel 11 may be injected from the injection outlet 12 into the discharging channels 20a, 20b. In some embodiments, one discharging channel 20a corresponds to one injection outlet 12. The mixture flows from one extruding system 10 or one injection outlet 12 into one discharging channel 20a. In some embodiments, one injection outlet 12 corresponds to several discharging channels 20a, 20b. In some embodiments, the extruding system 10 is configured to produce a plurality of portions of the mixture, wherein each portion of the mixture has a physical condition or property different from that of the other portions, and each of the discharging channels 20a, 20b is configured to discharge different portions of the mixture.

In some embodiments, the discharging channels 20a, 20b are connected to or communicable with the injection outlet 12. In some embodiments, each of the discharging channels 20a, 20b is attached to the injection outlet 12. The number of the discharging channels 20a, 20b may be adjusted according to the property of the mixture. The discharging channels 20a, 20b are parallel to each other and arranged adjacent to each other. In some embodiments, each discharging channel 20a, 20b may accommodate different amounts of the mixture injected from the injection outlet 12. The discharging channels 20a, 20b may discharge the same amount or different amounts of the mixture into the molding device 30. In some embodiments, each of the discharging channels 20a, 20b may operate under different temperatures.

Each discharging channel 20a, 20b has an outlet 21 distal from the injection outlet 12. In some embodiments, the outlets 21 can have widths or diameters different from the widths or diameters of the other outlets 21, and thus the outlets 21 can have different flow rates of the mixture. In some embodiments, the outlets 21 can discharge different amounts of the mixture. FIG. 1 illustrates two discharging channels 20a, 20b corresponding to one molding device 30 for clarity and simplicity, but such example is intended to be illustrative only, and is not intended to be limiting to the embodiments. A person ordinarily skilled in the art would readily understand that any suitable number of the discharging channels 20a, 20b may be utilized. Additionally, the discharging channels 20a, 20b are illustrated as having at least one different feature; this is intended to be illustrative and is not intended to limit the embodiments, as the discharging channels 20a, 20b may have similar structures or different structures in order to meet the desired functional capabilities.

The discharging channels 20a, 20b may be moved, extended, or fed synchronously or separately. In some embodiments, the outlets 21 of the discharging channels 20a, 20b may be extended into and be retracted from the molding device 30.

The number of the molding devices 30 may be adjusted according to requirements. In some embodiments, one molding device 30 corresponds to the discharging channels 20a, 20b. The mixture can flow from the extruding system 10 into one molding device 30 through the discharging channels 20a, 20b. Further, FIG. 1 illustrates only one molding device 30 for clarity and simplicity, but such example is intended to be illustrative only, and is not intended to be limiting to the embodiments. A person ordinarily skilled in the art would readily understand that any suitable number of the molding devices 30 may be utilized, and all such combinations are fully intended to be included within the scope of the embodiments.

In some embodiments, the discharging channels 20a, 20b are movable. In some embodiments, the discharging channels 20a, 20b can move horizontally, and then stop above one of the molding device 30 and align with the corresponding feeding ports 35a, 35b. After the alignment, the discharging channels 20a, 20b move toward the molding device 30, such that the discharging channels 20a, 20b engage with the molding device 30. In some embodiments, the discharging channels 20a, 20b are engaged with openings 341 of the upper mold base 34 respectively. After the engagement, the mixture is injected from the discharging channels 20a, 20b into the molding device 30. After the injection, the discharging channels 20a, 20b withdraw from the molding device 30, and then the extruding system 10 and the discharging channels 20a, 20b may move toward the next molding device 30.

The molding device 30 includes an upper mold base 34 and a mold under the upper mold base 34. In some embodiments, the mold includes an upper mold 32 under the upper mold base 34, a lower mold 33 opposite to the upper mold 32, and a hollow space 31 defined by the upper mold 32 and lower mold 33.

In some embodiments, the hollow space 31 is defined by the upper mold 32 and the lower mold 33. In some embodiments, the upper mold 32 and the lower mold 33 are complementary with and separable from each other. The lower mold 33 includes a lower mold cavity, and the upper mold 32 includes an upper mold cavity opposite to the lower mold cavity. In some embodiments, the hollow space 31 is formed by the upper mold cavity and the lower mold cavity. FIG. 1 illustrates one mold including one hollow space 31 for clarity and simplicity, but such example is intended to be illustrative only, and is not intended to be limiting to the embodiments. A person ordinarily skilled in the art would readily understand that one mold may include several hollow spaces 31. For example, one mold may include two hollow spaces 31 defined by one upper mold 32 and one lower mold 33.

In some embodiments, a plurality of feeding ports 35a, 35b corresponding to the discharging channels 20a, 20b are disposed in the molding device 30. In some embodiments, the feeding ports 35a, 35b are disposed over the upper mold 32 or the lower mold 33 and are communicable with the hollow space 31, the upper mold cavity or the lower mold cavity. FIG. 1 illustrates two feeding ports 35a, 35b included in one mold for clarity and simplicity, but such example is intended to be illustrative only, and is not intended to be limiting to the embodiments. A person ordinarily skilled in the art would readily understand that one mold may include one or more feeding ports 35 communicable with one or more hollow spaces 31.

The feeding port 35 is configured to dock the outlet 21. In some embodiments, several feeding ports 35a, 35b are disposed in the molding device 30 and configured to dock the corresponding outlets 21. In some embodiments, the discharging channels 20a, 20b are received by the upper mold base 34. Each of the discharging channels 20a, 20b is at least partially surrounded by the upper mold base 34, and the outlets 21 are docked to the feeding ports 35a, 35b. The mixture can be transported from the discharging channels 20a, 20b into the hollow space 31 through the outlet 21 and the feeding ports 35a, 35b. In some embodiments, the feeding ports 35a, 35b can have different widths or diameters. In some embodiments, the mixture is injected into the hollow space 31 and then a foamed article is formed in the hollow space 31 after a period of time.

In some embodiments, the upper mold base 34 includes openings 341 configured to receive the corresponding discharging channels 20a, 20b. Each of the openings 341 extends through the upper mold base 34. The upper mold base 34 may be mounted on the upper mold 32 by a screw, a clamp, a fastening means or the like. In some embodiments, the material of the upper mold base 34 is the same as the material of the upper mold 32. In some embodiments, a width of the upper mold base 34 is greater than that of the upper mold 32 or the lower mold 33. In some embodiments, the number of openings 341 corresponds to the number of the discharging channels 20a, 20b.

In some embodiments, a length L of each of the discharging channels 20a, 20b is related to some factors, such as a thickness H of the upper mold base 34, a clamping force for holding the molding device 30, properties of material for making the molding device 30, fluidity of the portion of the mixture, temperature of the portion of the mixture, or the like. In some embodiments, the thickness H of the upper mold base 34 is less than the length L of the discharging channels 20a, 20b.

In order to keep the fluidity and temperature of the mixture within a predetermined range, in some embodiments, the length L of each of the discharging channels 20a, 20b is reduced as much as possible but is still greater than the thickness H of the upper mold base 34.

In some embodiments, the injection-molding system 100 further includes a control system 60. The control system 60 is configured to control the extruding system 10, the discharging channels 20a, 20b, and the molding device 30. In some embodiments, the control system 60 automatically controls the extruding system 10, the discharging channels 20, and the molding devices 30 in real time.

In some embodiments, the control system 60 includes a central processor 61 and a plurality of sensors 62 electrically connected to or communicable with the central processor 61. In some embodiments, the sensors 62 are placed throughout the injection-molding system 100 and configured to sense at least one processing condition (e.g., flow rate or viscosity of the mixture through the discharging channels 20a, 20b, an amount of the mixture discharged from the discharging channels 20a, 20b, a pressure inside the hollow space 31, etc.) at a predetermined position of the injection-molding system 100. For example, at least one sensor 62 is installed at each outlet 21 for sensing the processing condition at each outlet 21. In some embodiments, the sensor 62 is configured to detect the processing condition and transmit a signal or data based on the processing condition detected to the central processor 61 for further analysis.

In some embodiments, the control system 60 is configured to adjust the mixing condition of the extruding system 10 and the extruding amount and timing of the discharging channels 20a, 20b. The flow rates of the mixture at the outlets 21 are adjustable. In some embodiments, the flow rates of the mixture at the outlets 21 can be adjusted automatically. In some embodiments, the flow rate of the mixture at the outlet 21 can be adjusted based on parameters such as pressure inside the hollow space 31, density of the mixture in the molding device 30, etc.

In some embodiments, one or more protrusions 36 are coupled with the hollow space 31 and disposed on an inner wall of the hollow space 31, and the foamed article formed in the hollow space 31 may have a groove corresponding to the protrusion 36. The number of the protrusions 36 may be adjusted according to requirements. In some embodiments, one or more grooves are disposed on an inner wall of the hollow space 31, and the foamed article formed in the hollow space 31 may have a protrusion corresponding to the grooves. The number of the grooves or protrusions 36 may be adjusted according to requirements. The number and location of the plurality of protrusions 36 and/or grooves are not particularly limited; for example, the protrusions 36 or grooves can be arranged at the inner sidewall of the hollow space 31 and separated from each other; however, the present invention is not limited thereto.

In some embodiments, the protrusion 36 or the groove is disposed at the inner top wall or the inner sidewall of the upper mold 32. In some embodiments, the feeding ports 35a, 35b and the protrusion 36 or the groove are disposed on opposite sides of the hollow space 31; as an example but not limitation, the feeding ports 35a, 35b are disposed at the inner top wall of the upper mold 32, and the protrusion 36 or the groove is disposed at the inner bottom wall of the lower mold 33. In some embodiments, the feeding ports 35a, 35b are disposed at the inner top wall of the upper mold 32, and the protrusion 36 or the groove is disposed at the inner sidewall of the lower mold 33. In some embodiments, the feeding ports 35a, 35b are disposed at the inner sidewall of the upper mold 32, and the protrusion 36 or the groove is disposed at the inner sidewall of the lower mold 33 and is located at a side opposite to the feeding ports 35a, 35b. In some embodiments, the feeding ports 35a, 35b are distal from the protrusion 36 or the groove.

Figure 2:
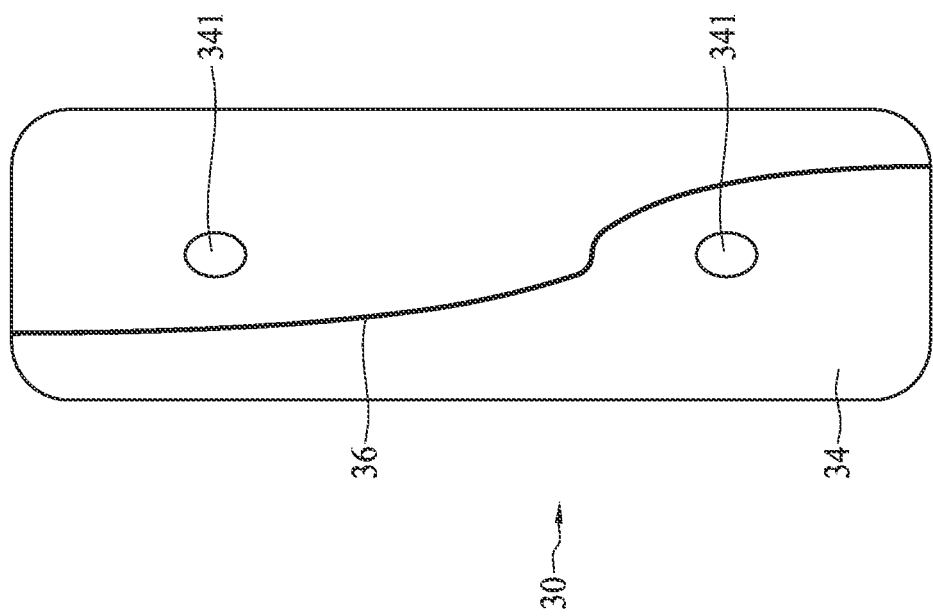
FIG. 2 is a top cross-sectional view of a molding device in an injection-molding system according to one embodiment of the present invention.

FIG. 2 is a top cross-sectional view of the molding device 30. In some embodiments, as shown in FIG. 2, the protrusion 36 or the groove extends across the hollow space 31 from a top view. The position and width of each of the feeding ports 35a, 35b can be adjusted according to configurations of the protrusion 36 such as its position in the hollow space 31, or the thickness, size or shape of the protrusion 36. The position and width of each of the feeding ports 35a, 35b can be adjusted according to a structural design of the mold cavity, the position of the groove, physical properties of the foamed article, etc.

Figure 3:
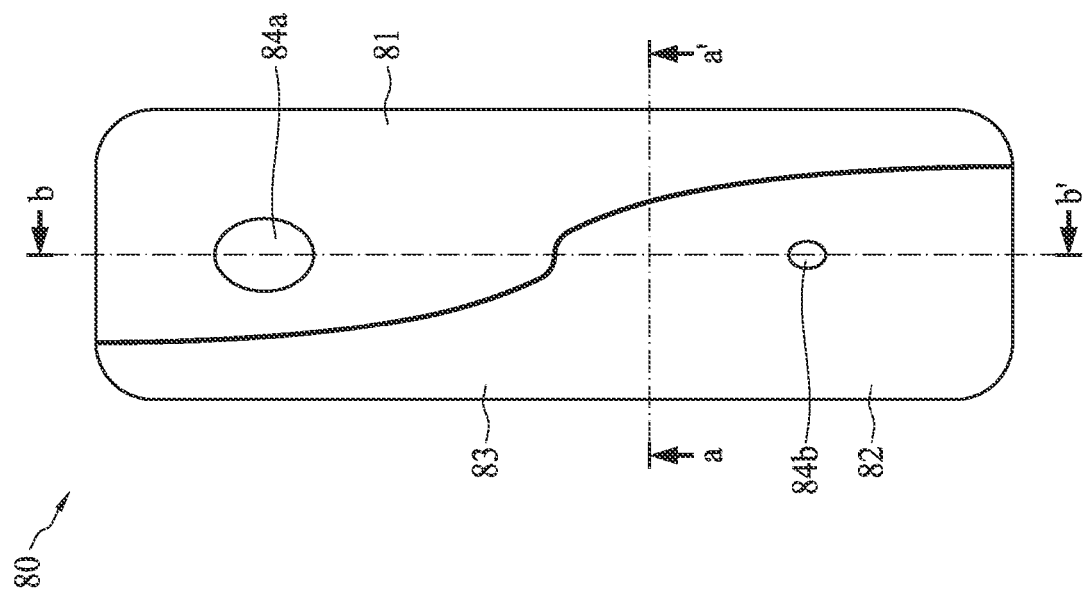
FIG. 3 is a top cross-sectional view of a foamed article formed by an injection-molding system according to one embodiment of the present invention.

FIG. 3 is a top view of a foamed article formed by an injection-molding system according to one embodiment of the present invention. In some embodiments, as shown in FIG. 3, different parts of the foamed article 80 may have the same or different properties or configurations such as density, thickness, flexibility, strength, etc. The differences may be minor. In some embodiments, the foamed article 80 may be a wearable device. In some embodiments, the foamed article 80 is customized according to user conditions or user requests.

In some embodiments, the foamed article 80 thus obtained may have portions with different properties. In some embodiments, the mixture is injected into the molding device 30 through two discharging channels 20a, 20b, and the foamed article 80 thus formed includes a first portion 81 and a second portion 82. The first portion 81 is formed by the mixture injected from one discharging channel 20a, and the second portion 82 is formed by the mixture injected from the other discharging channel 20b. In some embodiments, the groove 83 is disposed between the first portion 81 and the second portion 82. In some embodiments, the foamed article 80 is divided into the first portion 81 and the second portion 82 by the groove 83 from the top view.

The first portion 81 and second portion 82 of the foamed article 80 may have the same property or different properties or configurations such as density, thickness, flexibility, strength, etc. The properties and configurations of each portion depend on the feeding rate of the mixture, the shape of the hollow space 31, and structural configuration of the protrusion 36 of the molding device 30. In some embodiments, the groove 83 is formed on the foamed article 80 corresponding to the protrusion 36.

In some embodiments, the foamed article 80 may have marks 84a, 84b corresponding to the positions of the feeding ports 35a, 35b. In some embodiments, an outer surface of the foamed article 80 includes the marks 84a, 84b corresponding to the feeding ports 35a, 35b. The marks 84a, 84b may be formed due to the pressure difference between the hollow space 31 and the corresponding feeding ports 35a, 35b.

Each of the marks 84a, 84b may be circular or square in shape, but the disclosure is not limited thereto. In some embodiments, the first mark 84a and the second mark 84b are circular in shape. In some embodiments, the size and shape of each of the marks 84a, 84b is identical to the corresponding feeding port 35. The mark 84a, 84b can be a recess or a protrusion. In some embodiments, the mark 84a, 84b is slightly protruding. In some embodiments, the mark 84a, 84b is formed after application of a shear or cutting force over the outer surface of the foamed article 80. The density of the mark 84a, 84b may be different from that of the other portions of the foamed article 80. The marks 84a, 84b may be same or different. The appearance of the mark 84a, 84b depends on the width of the corresponding feeding port 35, the properties of the material, etc.

In some embodiments, a first mark 84a is disposed at the first portion 81, and a second mark 84b is disposed at the second portion 82. The first mark 84a is disposed distal from the second mark 84b. In some embodiments, the first mark 84a and the second mark 84b are disposed along a main central axis b-b' of the foamed article 80. In some embodiments, the main central axis b-b' extends along a longest dimension of the foamed article 80. In some embodiments, the first mark 84a and the second mark 84b are disposed in a row along the longest dimension of the foamed article 80. In some embodiments, the first mark 84a and the second mark 84b have same or different dimensions and shapes. In some embodiments, the first mark 84a is larger than the second mark 84b.

Figure 4:
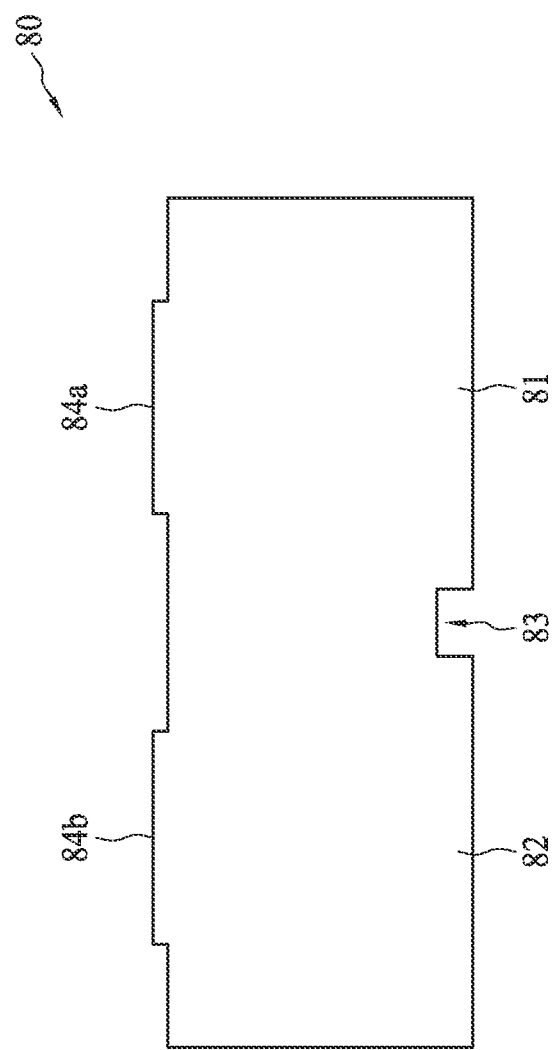
FIG. 4 is a cross-sectional view along a line a-a' of the foamed article of FIG. 3.

FIG. 4 is a cross-sectional view along a line b-b' of FIG. 3. In some embodiments, referring to FIGS. 3 and 4, the foamed article 80 has a groove 83 corresponding to the protrusion 36 included in the hollow space 31. In some embodiments, the first portion 81 and the second portion 82 are separated by the groove 83 due to the inability of the mixture injected to the first portion 81 to easily flow to the second portion 82, and the inability of the mixture injected to the second portion 82 to easily flow to the first portion 81. In some embodiments, a surface of the foamed article 80 has a pattern. The pattern may be a silky pattern. In some embodiments, the pattern is a shiny pattern.

Figure 5:
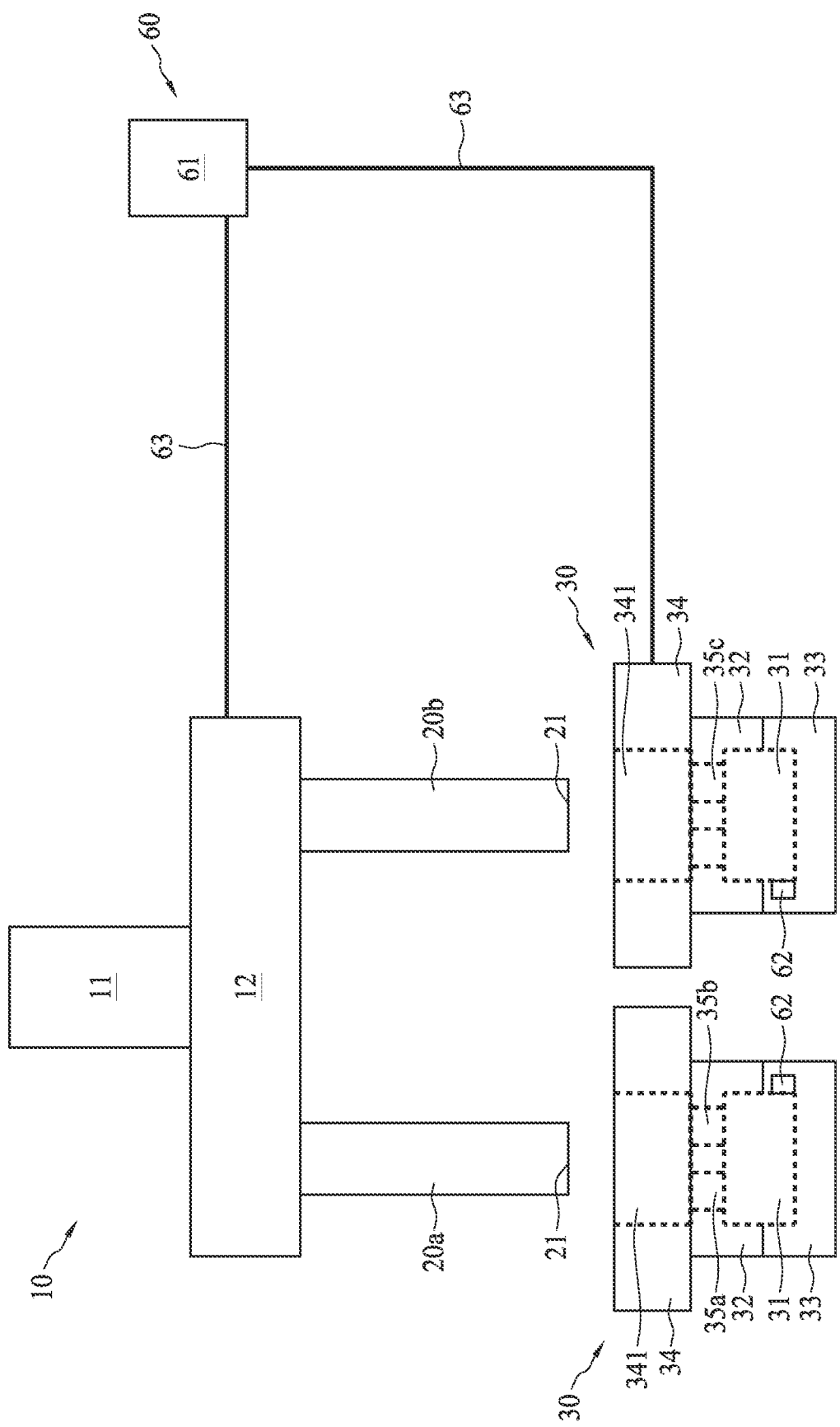
FIGS. 5 to 10 are schematic diagrams of an injection-molding system in various configurations.

FIGS. 5 to 10 are schematic diagrams of injection-molding systems in various configurations. In some embodiments, as shown in FIG. 5, each of the discharging channels 20a, 20b corresponds to a molding device 30. The mixture can be extruded to each of the discharging channels 20a, 20b through the injection outlet 12. In some embodiments, each of the discharging channels 20a, 20b can discharge the same or different amounts of the mixture. In some embodiments, the discharging channels 20a, 20b have widths or diameters same as or different from those of other discharging channels 20a, 20b. In some embodiments, the discharging channels 20a, 20b have flow rates same as or different from those of other discharging channels 20a, 20b. In some embodiments, since one extruding system 10 is required to supply the mixture for several discharging channels 20a, 20b, the extruding system 10 with a relatively higher extruding power or conveying speed is required in order to be capable of providing a sufficient amount of the mixture for each of the molding devices 30 within a predetermined period of time. In some embodiments, the number of discharging channels 20a, 20b is the same as the number of molding devices 30. For example, as shown in FIG. 5, there are two discharging channels 20a, 20b corresponding to two molding devices 30. FIG. 5 illustrates two discharging channels 20a, 20b and two molding devices 30 for clarity and simplicity, but such example is intended to be illustrative only, and is not intended to be limiting, A person ordinarily skilled in the art would readily understand that any suitable numbers of the discharging channels 20a, 20b and the molding devices 30 can be utilized, and all such combinations are fully intended to be included within the scope of the embodiments.

In some embodiments, each of the hollow spaces 31 of the molding devices 30 receives a same amount or different amounts of the mixture. In some embodiments, each of the hollow spaces 31 of the molding devices 30 receives the mixture at the same time or at different times. For example, the discharging channel 20a (on the left in FIG. 5) is closed by a valve or the like and thus no mixture can flow into the hollow space 31 (on the left in FIG. 5) during a flowing of the mixture from another discharging channel 20b (on the right in FIG. 5) into the hollow space 31 (on the right in FIG. 5).

In some embodiments, each of the molding devices 30 includes one or more of the feeding ports 35a, 35b, 35c. In some embodiments, molding devices 30 may have a same number or different numbers of the feeding ports 35a, 35b, 35c. For example, the molding device 30 (on the left in FIG. 5) has two feeding ports 35a, 35b communicable with the corresponding discharging channel 20a, and another molding device 30 (on the right in FIG. 5) has one feeding port 35c communicable with the corresponding discharging channel 20b. In other words, one discharging channel 20a, 20b may correspond to several feeding ports 35a, 35b.

In some embodiments, the control system 60 controls the molding devices 30 and the discharging channels 20a, 20b. In some embodiments, the cables 63 are electrically connected between the control system 60 and the extruding system 10, the discharging channels 20a, 20b, and the molding devices 30. The cables 63 are configured to transmit the signal from the molding devices 30 to the extruding system 10 and the discharging channels 20a, 20b.

Figure 6:
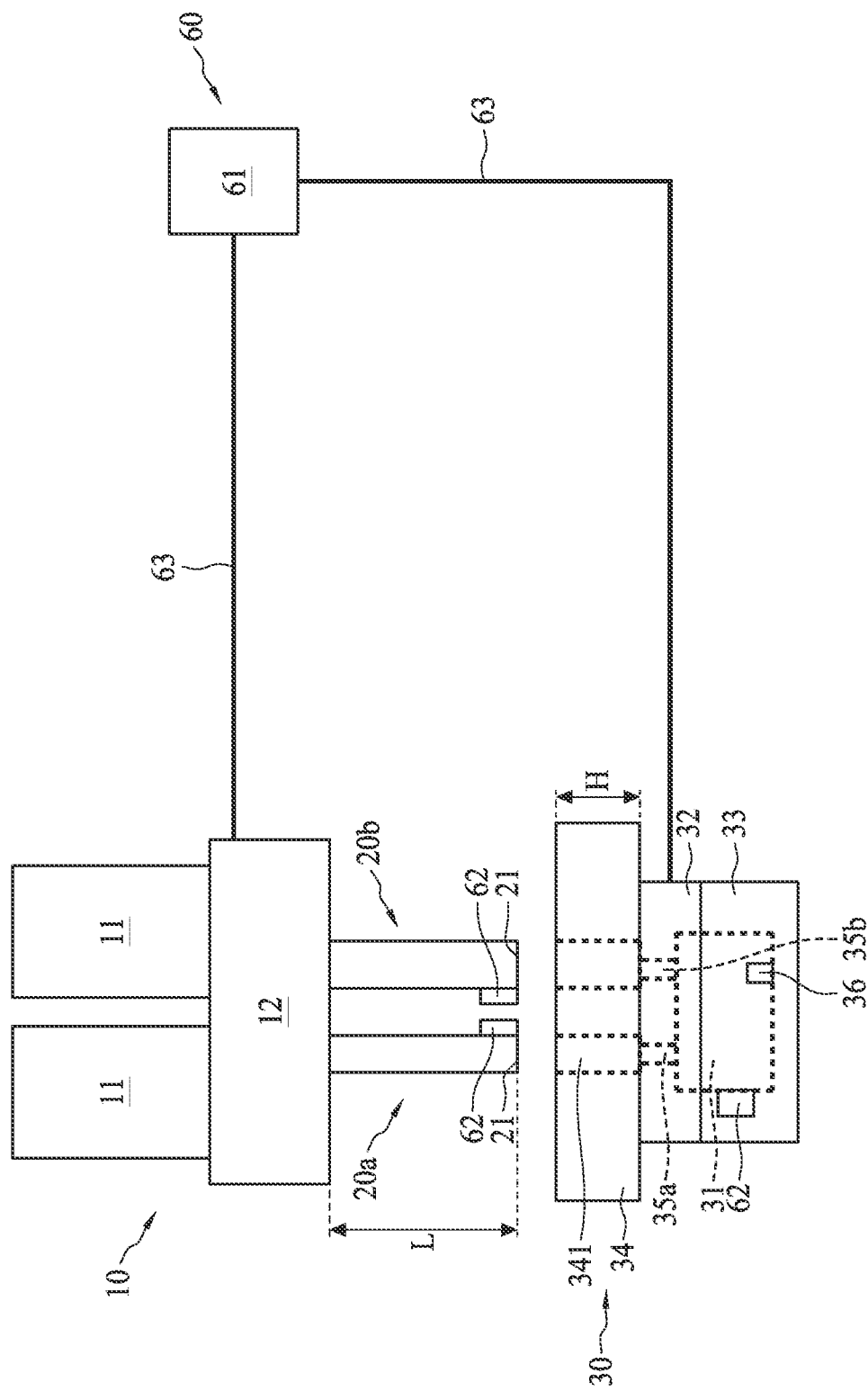

In some embodiments, as shown in FIG. 6, several mixing barrels 11 correspond to one injection outlet 12, and one injection outlet 12 corresponds to several discharging channels 20a, 20b. In other words, several mixing barrels 11 are connected to or communicable with one injection outlet 12, and one injection outlet 12 is connected to or communicable with several discharging channels 20a, 20b. In some embodiments, the extruding systems 10 are configured to produce a plurality of portions of the mixture, wherein each portion of the mixture has physical condition or property different from each other, and each of the discharging channels 20a, 20b is configured to discharge different portions of the mixture. FIG. 6 illustrates two mixing barrels 11 for clarity and simplicity, but such example is intended to be illustrative only, and is not intended to be limiting. A person ordinarily skilled in the art would readily understand that any suitable number of the extruding systems 10 can be utilized, and all such combinations are fully intended to be included within the scope of the embodiments.

Compared to the embodiment of FIG. 5, the embodiment of FIG. 6 requires a relatively lower extruding power or conveying speed, since each of the mixing barrels 11 in the embodiment of FIG. 6 is only required to supply the mixture for one of the discharging channels 20a, 20b.

Figure 7:
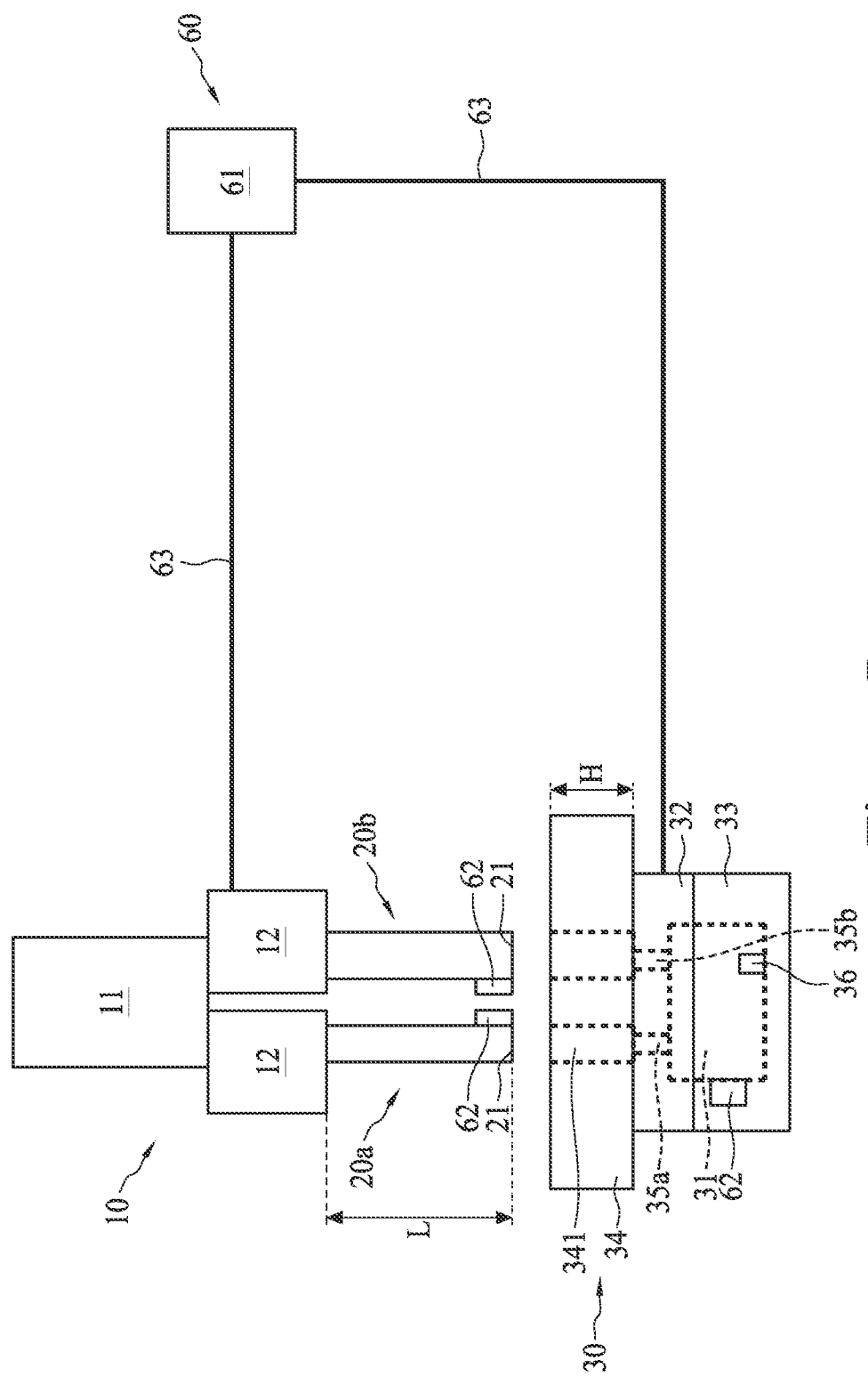

In some embodiments, as shown in FIG. 7, one extruding system 10 corresponds to several injection outlets 12, and several injection outlets 12 correspond to several discharging channels 20a, 20b. In other words, one extruding system 10 is connected to or communicable with several injection outlets 12, and several injection outlets 12 are connected to or communicable with several discharging channels 20a, 20b. FIG. 7 illustrates two injection outlets 12 for clarity and simplicity, but such example is intended to be illustrative only, and is not intended to be limiting. A person ordinarily skilled in the art would readily understand that any suitable number of the injection outlets 12 can be utilized, and all such combinations are fully intended to be included within the scope of the embodiments.

Figure 8:
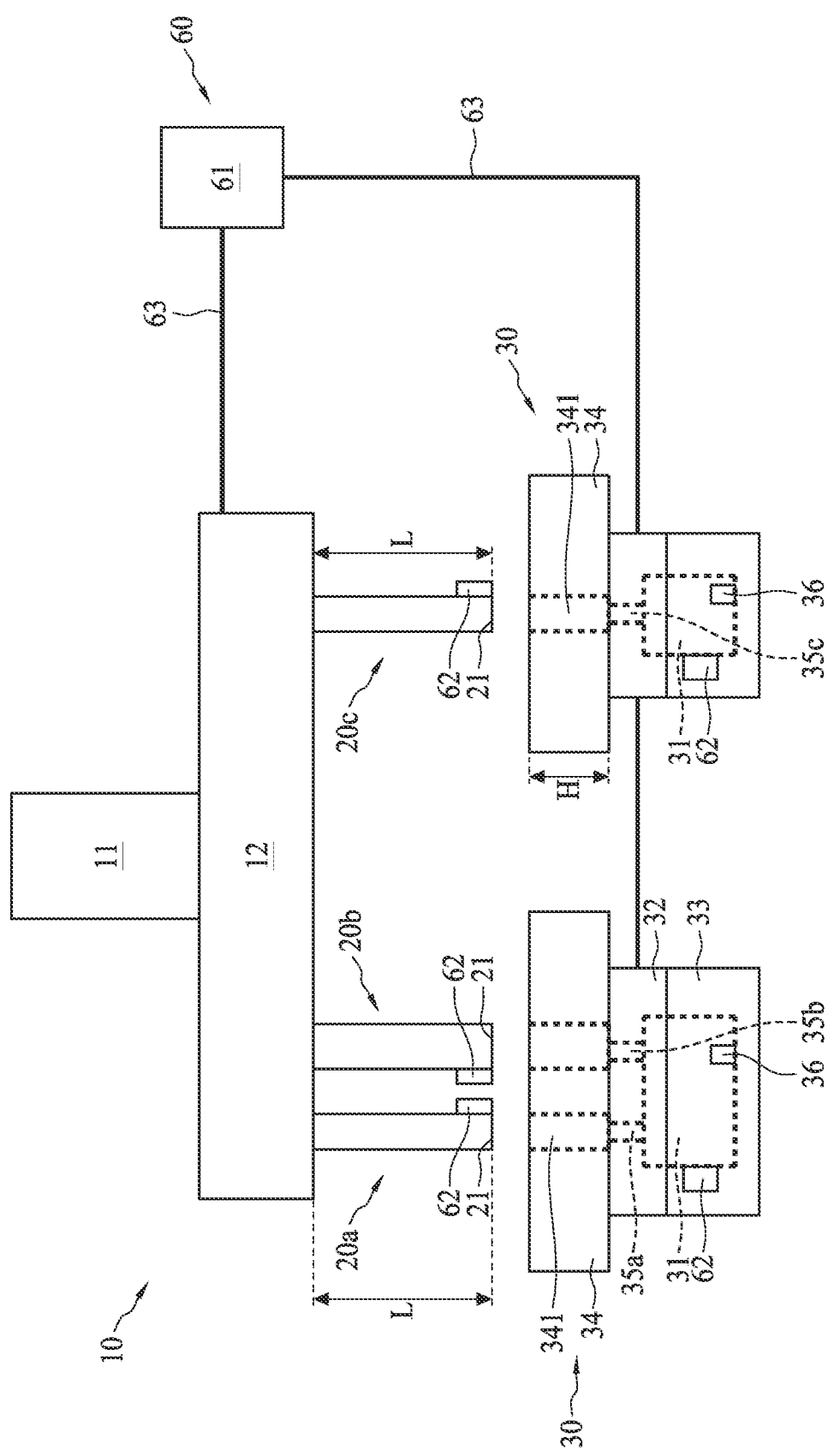

In some embodiments as shown in FIG. 8, each of the discharging channels 20a, 20b, 20c corresponds to one of several molding devices 30. In some embodiments, the discharging channels 20a, 20b, 20c are arranged in a line, a row, a column, an arc, a curve or any other suitable arrangements. The molding devices 30 may be similar to each other or different from each other. FIG. 8 illustrates two molding devices 30 for clarity and simplicity, but such example is intended to be illustrative only, and is not intended to be limiting. A person ordinarily skilled in the art would readily understand that any suitable number of the molding devices 30 can be utilized, and all such combinations are fully intended to be included within the scope of the embodiments.

In some embodiments, the molding devices 30 receive the mixture at the same times or at different times. For example, the discharging channels 20a, 20b (on the left and in the middle in FIG. 8) are closed by a flow rate controller or the like and thus no mixture can flow into the hollow spaces 31 of the molding device 30 (on the left in FIG. 8) during the flowing of the mixture from another discharging channel 20c (on the right in FIG. 8) into the hollow space 31 of another mold (on the right in FIG. 8).

Figure 9:
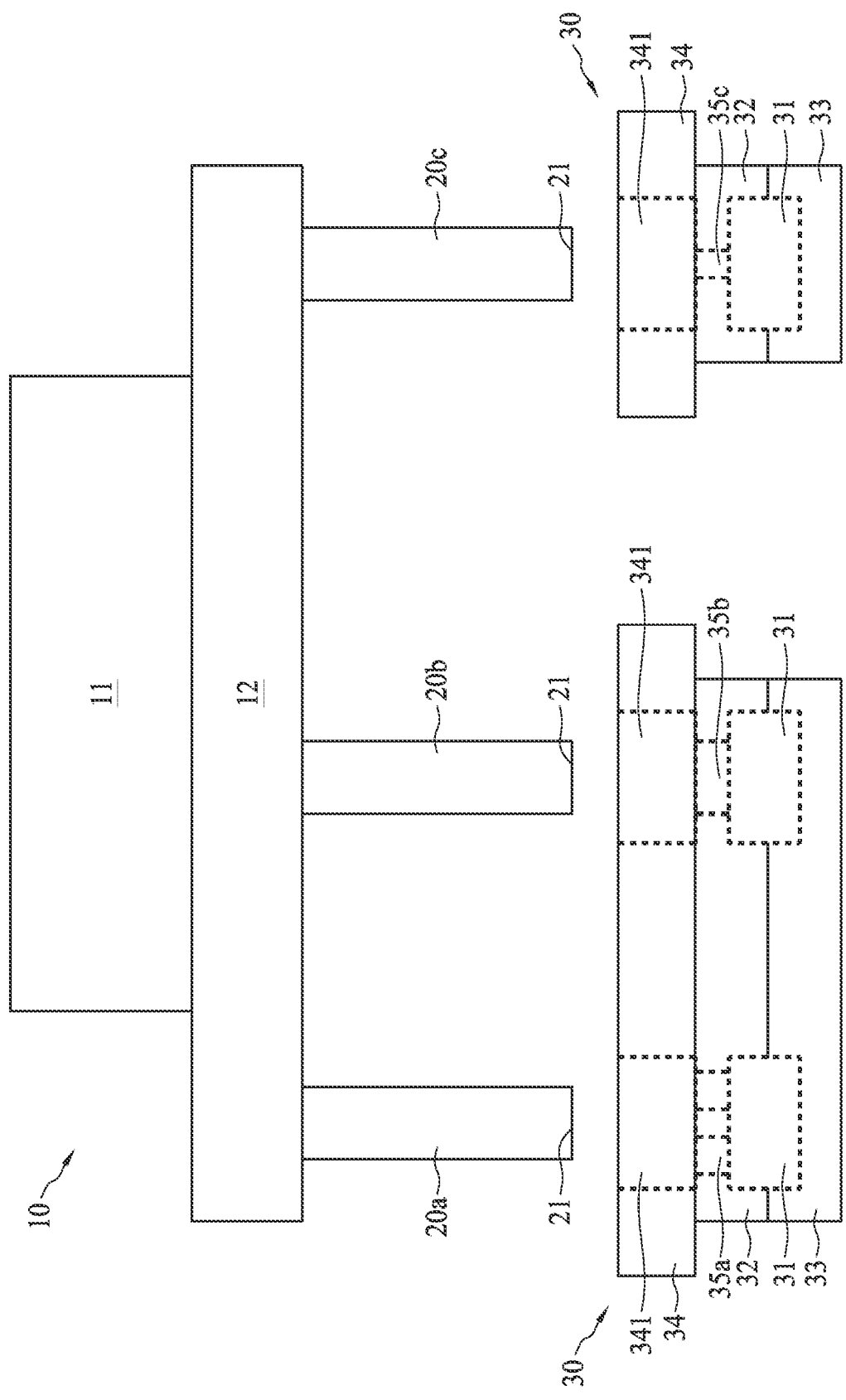

In some embodiments, as shown in FIG. 9, the molding device 30 may include several hollow spaces 31. In some embodiments, the hollow spaces 31 of the molding device 30 are isolated from each other and are not communicable with each other. FIG. 9 illustrates the molding device 30 including two hollow spaces 31 for clarity and simplicity, but such example is intended to be illustrative only, and is not intended to be limiting. Each of the molding devices 30 may correspond to one or more discharging channels 20a, 20b. A person ordinarily skilled in the art would readily understand that any suitable number of the hollow spaces 31 can be utilized, and all such combinations are fully intended to be included within the scope of the embodiments.

In some embodiments, the hollow spaces 31 of the molding devices 30 have a same volume as each other or different volumes from each other. For example, a volume of the hollow space 31 (on the left in FIG. 9) is greater than a volume of another hollow space 31 (in the middle in FIG. 9). In some embodiments, each hollow space 31 may receive the mixture in a same amount or in different amounts. For example, the hollow space 31 (on the left in FIG. 9) receives a larger amount of the mixture than another hollow space 31 (in the middle in FIG. 9). In some embodiments, each hollow space 31 may receive the mixture at the same time or at different times. For example, the discharging channels 20a, 20c (on the left and right in FIG. 9) are closed by a flow rate controller or the like and thus no mixture can flow into the hollow spaces 31 (on the left and right in FIG. 9) during the flowing of the mixture from another discharging channel 20b (in the middle) into the another hollow space 31 (in the middle in FIG. 9).

In some embodiments, the discharging channels 20a, 20b are communicable with different hollow spaces 31 of the molding device 30 (on the left in FIG. 9). In some embodiments, each of the discharging channels 20a, 20b can discharge the same amount or different amounts of the mixture. In some embodiments, the discharging channels 20a, 20b have widths or diameters that are same as or different from each other. In some embodiments, the discharging channels 20a, 20b have flow rates that are same as or different from flow rates of other discharging channels 20a, 20b. FIG. 9 illustrates the mixture being injected into each hollow spaces 31 of the molding device 30 through the corresponding discharging channels 20a, 20b, 20c for clarity and simplicity, but such example is intended to be illustrative only, and is not intended to be limiting. A person ordinarily skilled in the art would readily understand that any suitable number of the discharging channels 20a, 20b, 20c can be utilized, and all such combinations are fully intended to be included within the scope of the embodiments.

Figure 10:
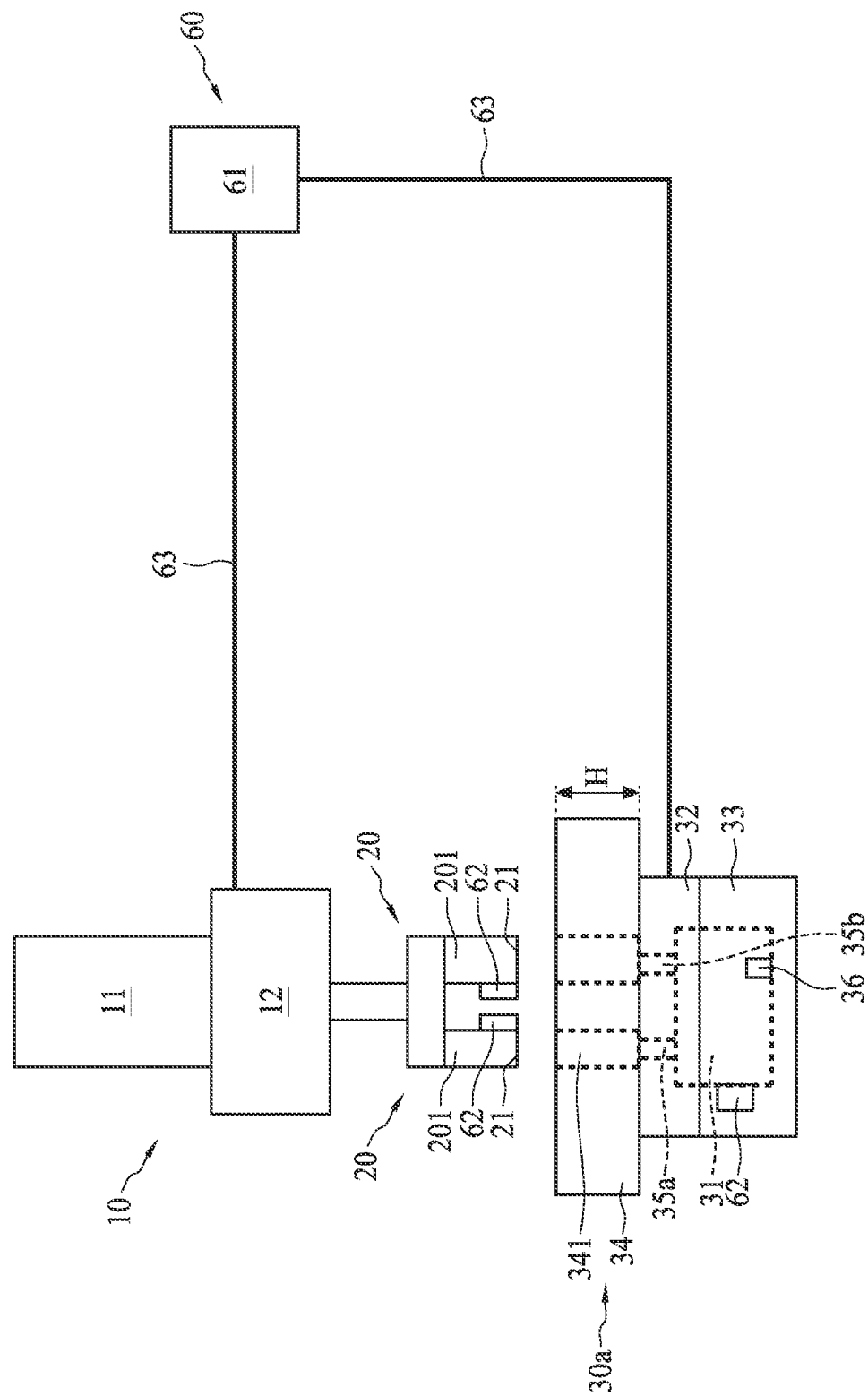

In some embodiments, referring to FIG. 10, the extruding system 10 is connected to or communicable with one discharging channel 20 and the discharging channel 20 has a plurality of outlets 21. In some embodiments, the discharging channel 20 splits into a plurality of branches 201, and each of the branches 201 has an outlet 21 distal from the injection outlet 12. The number of the branches 201 may be adjusted according to the properties of the mixture. In some embodiments, each branch 201 may accommodate different amounts of the mixture injected from the mixing barrel 11. The branches 201 may discharge the same amount or different amounts of the mixture into the molding device 30. In some embodiments, each branch 201 may operate under a different temperature.

In some embodiments, the outlets 21 of the branches 201 can have widths or diameters that are different from those of other outlets 21, and thus the outlets 21 can have different flow rates. In some embodiments, the outlets 21 can inject different amounts of the mixture. FIG. 10 illustrates two branches 201 corresponding to one molding device 30 for clarity and simplicity, but such example is intended to be illustrative only, and is not intended to be limiting. A person ordinarily skilled in the art would readily understand that any suitable number of the branches 201 may be utilized. Additionally, the branches 201 are illustrated as having at least one different feature, which is intended to be illustrative and is not intended to limit the embodiments, as the branches 201 may have similar structures or different structures in order to meet the desired functional capabilities.

Figure 11C:
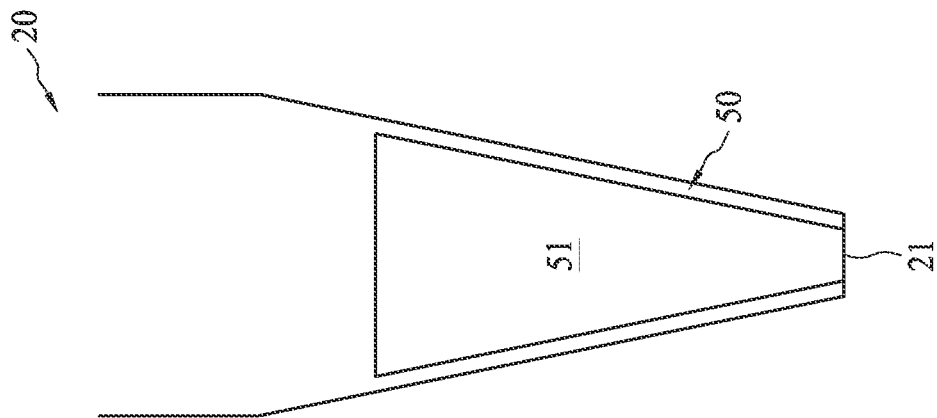
FIGS. 11a to 11c are schematic diagrams of a discharging channel in various configurations.
Figure 11B:
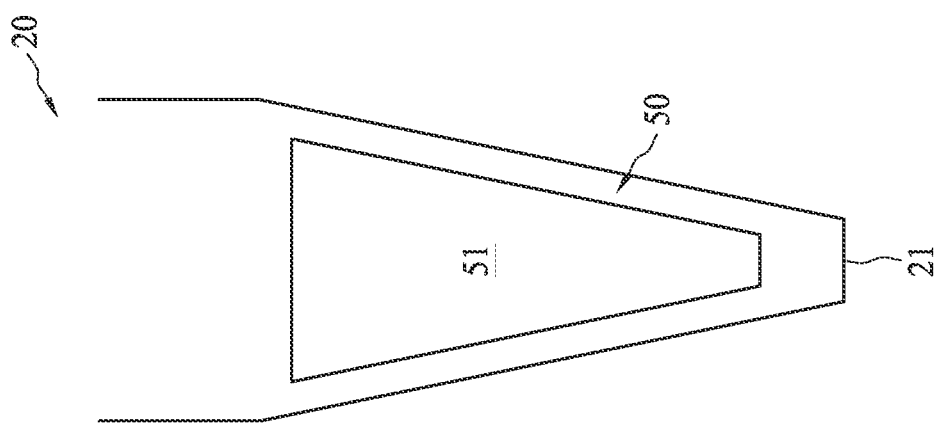
Figure 11A:
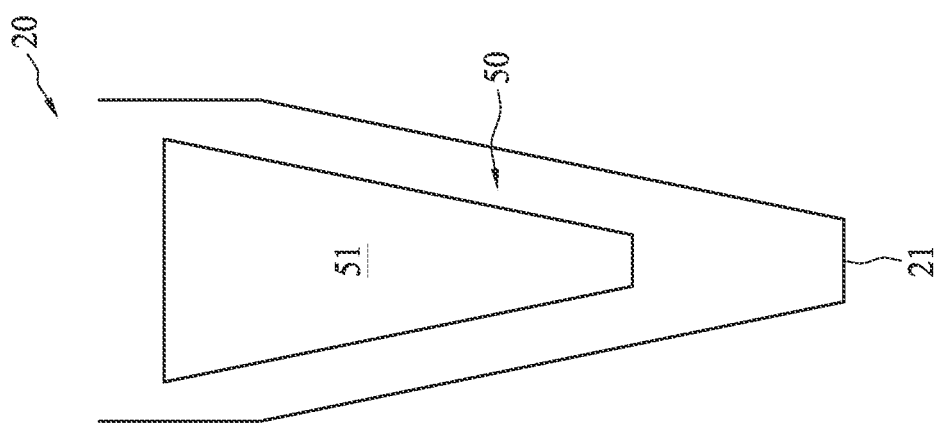

FIGS. 11a to 11c are schematic diagrams showing the discharging channel 20 in various configurations or states. In some embodiments, referring to FIGS. 11a to 11c, the discharging channel 20 is in a tapered configuration. In some embodiments, the discharging channel 20 is tapered toward the outlet 21, such that the discharging channel 20 proximal to the outlet 21 has a width substantially less than the discharging channel 20 distal to the outlet 21. For example, a diameter of the discharging channel 20 proximal to the outlet 21 is substantially less than a diameter of the discharging channel 20 distal to the outlet 21.

In some embodiments, at least one of the plurality of discharging channels 20 further includes a flow rate controller 50. In some embodiments, each of the discharging channels 20 includes the flow rate controller 50, and the flow rates of the mixture at the corresponding outlets 21 can be the same, slightly different, or significantly different. In some embodiments, the flow rate controller 50 is controlled by the control system 60. The flow rate controller 50 may be an adjustable plug 51 disposed in the discharging channel 20. The plug 51 is configured to adjust the flow rate of the mixture at the outlet 21. In some embodiments, the plug 51 is movable relative to the discharging channel 20. In some embodiments, the plug 51 is movable toward and away from the outlet 21.

In some embodiments, the flow rates of the mixture at the outlets 21 can be adjusted by changing the width or diameter of the outlet 21, the amount of the mixture extruded from the injection outlet 12, or the position of the plug 51. In some embodiments, the flow rate of the mixture at the outlet 21 may be first adjusted by changing the width or diameter of the outlet 21 and/or the amount of the mixture extruded from the injection outlet 12, and then further adjusted by changing the position of the plug 51.

In some embodiments, referring to FIG. 11a, the plug 51 is distal from the outlet 21. In some embodiments, referring to FIG. 11b, compared with FIG. 11a, the plug 51 as shown in FIG. 11b is closer to the outlet 21 but not in contact with the outlet 21, so that an amount of the mixture discharged from the outlet 21 as shown in FIG. 11a is substantially more than an amount of the mixture discharged from the outlet 21 as shown in FIG. 11b. In some embodiments, the plug 51 is very close to the outlet 21, such that only a small amount of the mixture can be discharged from the outlet 21.

In some embodiments, referring to FIG. 11c, a portion of the plug 51 blocks the outlet 21, such that the mixture cannot flow out of the outlet 21. In other words, the plug 51 can serve as a valve to allow the mixture to flow out from the outlet 21 (for example, as shown in FIGS. 11a to 11c) or to prevent the mixture from flowing out from the outlet 21.

Figure 12:
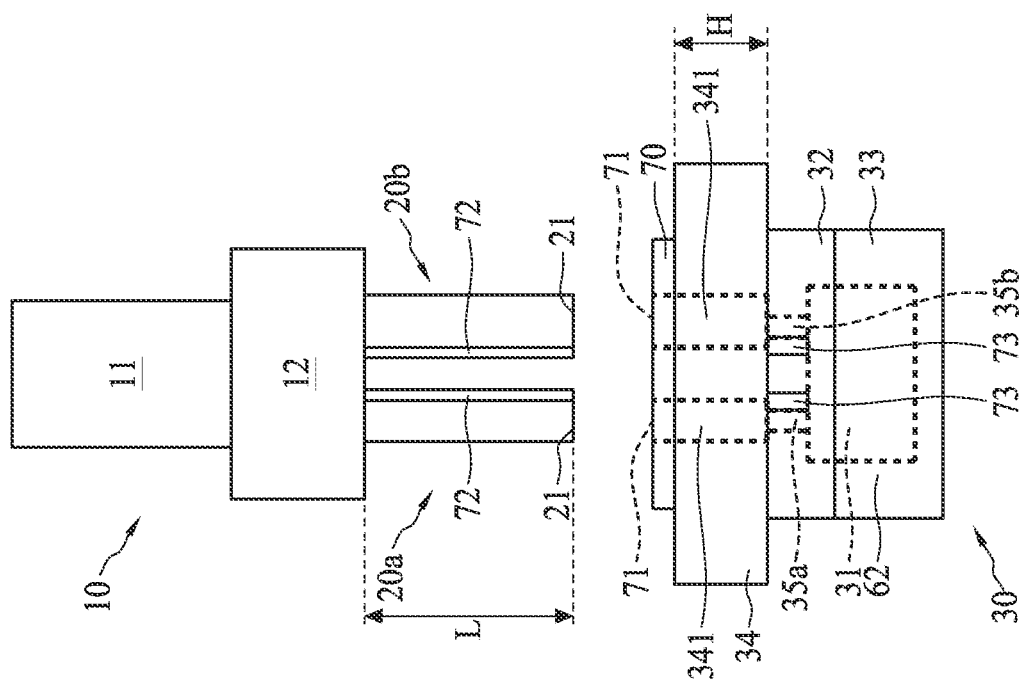
FIG. 12 is a schematic diagram of an injection-molding system according to one embodiment of the present invention.

FIG. 12 is a schematic diagram of an injection-molding; system according to one embodiment of the present invention. In some embodiments, referring to FIG. 12, in order to maintain the temperature difference between the discharging channels 20a, 20b and the molding device 30, the injection-molding system further includes an insulator 70 disposed between the discharging channels 20a, 20b and the molding devices 30. In some embodiments, the insulator 70 is disposed between the discharging channels 20a, 20b and the upper mold base 34. In some embodiments, the insulator 70 is disposed on the upper mold base 34. In some embodiments, the insulator 70 is disposed between the outlet 21 and the feeding ports 35a, 35b.

Each of the discharging channels 20a, 20b may extend into the insulator 70 and is thereby partially surrounded by the insulator 70. In some embodiments, the insulator 70 includes openings 71 configured to receive the corresponding discharging channels 20a, 20b. The openings 71 of the insulator 70 are aligned with the openings 341 of the upper mold base 34. Each of the openings 71 extends through the insulator 70. The insulator 70 may be mounted on the upper mold base 34, such as by a screw. The insulator 70 may include a non-thermally conductive material, such as a fiberglass. The insulator 70 may be comprised entirely of non-metal materials. In some embodiments, the insulator 70 has a melting point substantially greater than a temperature of the mixture flowing through the discharging channels 20a, 20b. In some embodiments, the melting point of the insulator 70 is substantially greater than 180° C.

In some embodiments, a width of the insulator 70 is less than that of the upper mold base 34. The thickness of the insulator 70 may be related to several factors, such as properties of materials for making the molding device 30 and the discharging channels 20a, 20b, temperatures of the discharging channels 20a, 20b and the upper mold base 34, or the like. In some embodiments, the thickness of the insulator 70 is less than the thickness H of the upper mold base 34.

In some embodiments, the temperature of each of the discharging channels 20a, 20b is different from the temperature of the molding device 30. The temperature of each discharging channel 20a, 20b is greater than that of the molding device 30. In some embodiments, the temperature of each discharging channel 20a, 20b ranges between 150° C. and 200° C., and a temperature of the molding device 30 may range between 20° C. and 60° C.

In some embodiments, in order to maintain the temperature difference between the discharging channels 20a, 20b and the molding device 30 and maintain the fluidity of the mixture, at least one of the plurality of discharging channels 20a, 20b further includes a heater 72 disposed thereon. The heater 72 is configured to maintain or adjust the temperature of the discharging channels 20a, 20b within a predetermined range. The heater 72 may keep the discharging channels 20a, 20b within the same or different predetermined ranges. In some embodiments, each of the discharging channels 20a, 20b includes the heater 72 disposed thereon. In some embodiments, each of the discharging channels 20a, 20b includes the heater 72 disposed around the outlet 21. In some embodiments, the heaters 72 may enter the openings 71 and the openings 341 together with the corresponding discharging channels 20a, 20b when the discharging channels 20a, 20b are engaged with the molding device 30. The positions and number of the heaters 72 may be adjusted according to requirements, and are not particularly limited. Each of the discharging channels 20a, 20b may include a different number of heaters 72 or no heater 72.

In some embodiments, in order to maintain the fluidity of the mixture, the molding device 30 further includes a heater 73 configured to maintain the temperature of the feeding ports 35a, 35b within a predetermined range. In some embodiments, the heater 73 is disposed in the upper mold base 34 or the upper mold 32. In some embodiments, the heater 73 is disposed adjacent to the feeding ports 35a, 35b. The positions and number of the heaters 73 may be adjusted according to requirements, and are not particularly limited. In some embodiments, the feeding ports 35a, 35b can be heated to a predetermined temperature (e.g., 200° C. or above) by the heater 73 during flowing of the mixture from the discharging channels 20a, 20b into the molding device 30, and then the feeding ports 35a, 35b can be instantly cooled down to a predetermined temperature (e.g., 50° C. or lower) when the flowing of the mixture is completed. In some embodiments, the feeding ports 35a, 35b are cooled down when the discharging channels 20a, 20b are withdrawn from the molding device 30. In some embodiments, such instant cooling can be implemented by turning off the heater 73 or turning on a cooling member disposed adjacent to the feeding port 35. Each of the molding devices 30 can include different numbers of heaters 73 or may not include any heater. In some embodiments, the injection-molding system includes the extruding system 10, the discharging channels 20a, 20b, and a single molding device 30, wherein the molding device 30 includes the heater 73 configured to adjust the temperature of the feeding port 35. In some embodiments, each of the feeding ports 35a, 35b includes the heater 73 disposed thereon.

In some embodiments, the control system 60 further electrically controls the insulator 70, the heaters 72 of the discharging channels 20a, 20b, and the heaters 73 of the molding devices 30 in real time. In some embodiments, the control system 60 controls the discharging channels 20a, 20b to be connected to the molding devices 30, and controls the heaters 72 of the discharging channels 20a, 20b or the heaters 73 of the molding device 30 to heat the discharging channels 20a, 20b, the outlets 21 or the feeding ports 35a, 35b to their own predetermined temperature or maintain the discharging channels 20a, 20b, the outlets 21 or the feeding ports 35a, 35b at their own predetermined temperature.

Figure 13:
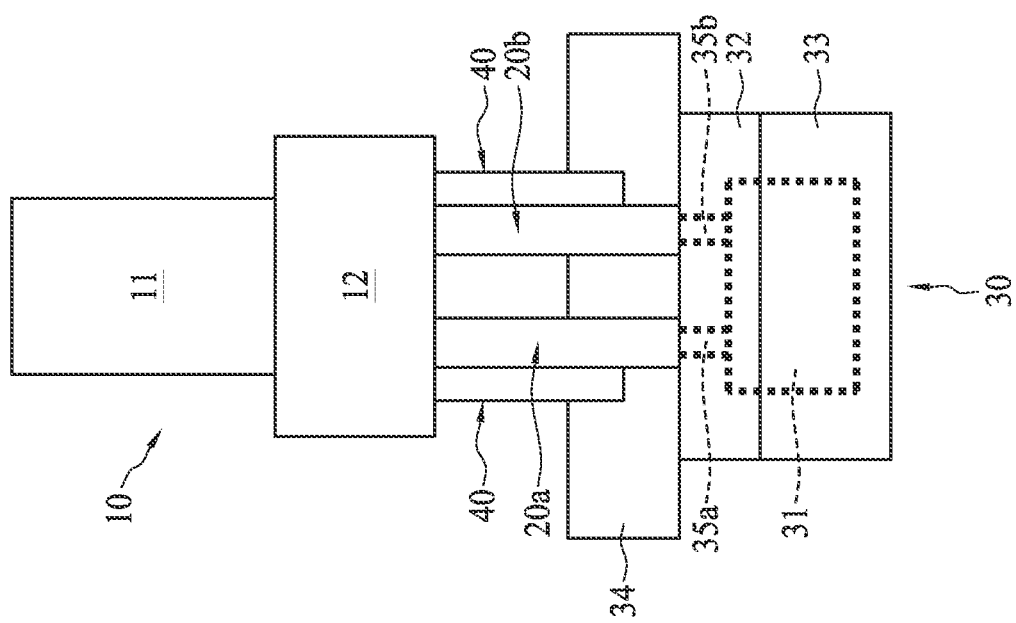
FIG. 13 is a schematic diagram of an injection-molding according to one embodiment of the present invention.

FIG. 13 is a schematic diagram of an injection-molding system according to one embodiment of the present invention. In some embodiments, referring to FIG. 13, the injection-molding system further includes a supporting unit 40 configured to facilitate an engagement of the discharging channels 20a, 20b to each of the plurality of molding devices 30. The supporting unit 40 can be disposed at any suitable position in the injection-molding system 200. In some embodiments, the supporting unit 40 is configured to support the discharging channels 20a, 20b. In some embodiments, the supporting unit 40 is used to prevent separation of the discharging channels 20a, 20b and the molding device 30 during the injection of the mixture. In some embodiments, the control system 60 controls the supporting unit 40 in real time.

Figure 14:
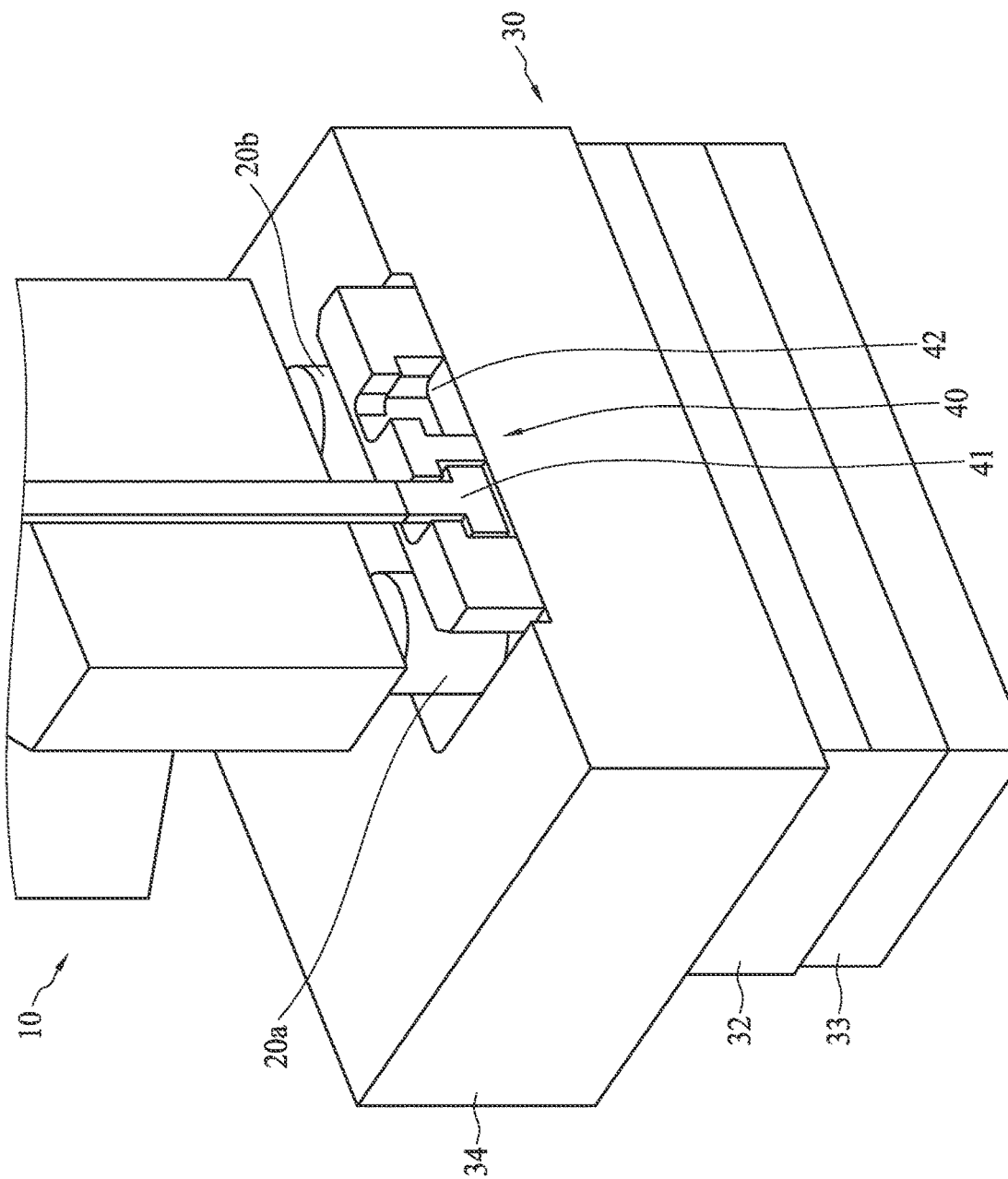
FIG. 14 is a schematic diagram of a part of the injection-molding system in FIG. 13 according to one embodiment of the present invention.

FIG. 14 is a schematic diagram of a part of the injection-molding system according to one embodiment of the present invention. In some embodiments, referring to FIG. 14, the supporting device 40 includes first and second elements 41, 42 configured to engage with each other, wherein the first element 41 protrudes from the extruding system 10 or the discharging channel 20, and the second element 42 is disposed on each of the plurality of molding devices 30, but the disclosure is not limited thereto. In some embodiments, the first and second elements, 41, 42 can be clamped to each other; for example, the second element 42 can be configured to receive the first element 41. In some embodiments, the first element 41 is disposed on the discharging channel 20, and the second element 42 is disposed on each molding device 30. In some embodiments, the second element 42 is disposed on the upper mold base 34 of the molding device 30. In some embodiments, the first element 41 is a part of the extruding system 10 or the discharging channel 20, while the second element 42 is a part of the molding device 30. In some embodiments, the first element 41 is a part of the extruding system 10 and disposed adjacent to the discharging channels 20a, 20b, and the second element 42 is disposed above or facing toward the upper mold base 34 of the molding device 30. In some embodiments, the first element 41 and the second element 42 can engage with each other, thereby tightly engaging the discharging channels 20a, 20b with the upper mold base 34 of the molding device 30.

In some embodiments, in order to prevent separation of the extruding system 10 and the molding device 30 during the injection of the mixture, the engaged first element 41 is subjected to a force to against the second element 42. The force may be equal to or greater than a threshold. The threshold may be adjusted according to the pressure in the hollow space 31 and the diameter of the outlet 21, or according to other factors.

The position and number of the first elements 41 may be adjusted according to requirements, and are not particularly limited. The position and number of the second elements 42 may also be adjusted according to requirements, and are not particularly limited. In some embodiments, the position and number of the second elements 42 correspond to the position and number of the first elements 41. In an embodiment, the first element 41 can be disposed at any suitable position on the discharging channel 20, and the second element 42 can be disposed at any suitable position on the molding device 30. In some embodiments, the second element 42 is disposed above the upper mold 32.

Figure 15:
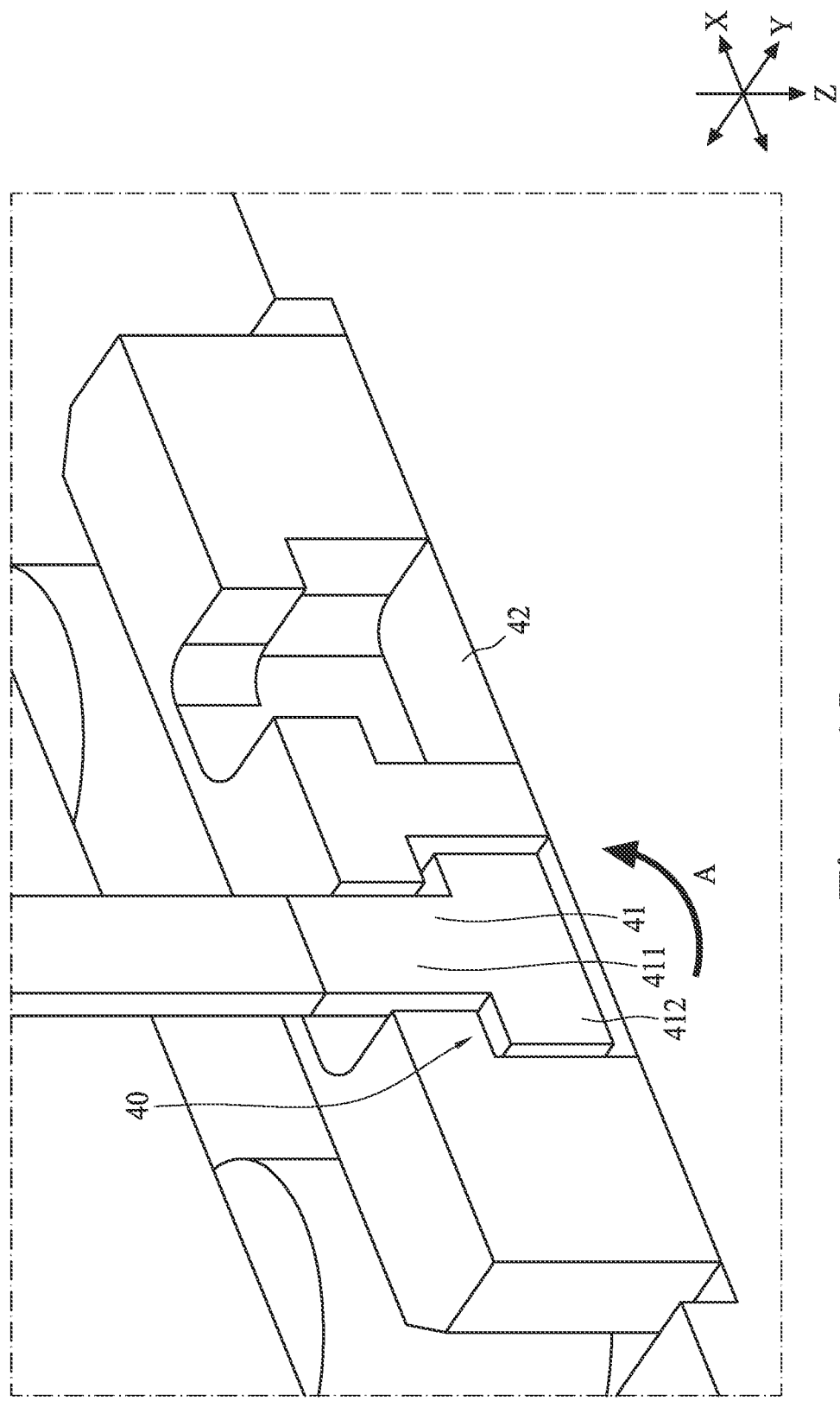
FIG. 15 is a schematic diagram of a part of the injection-molding system in FIG. 13 according to one embodiment of the present invention.

FIG. 15 is a schematic diagram of a portion of the injection-molding system according to one embodiment of the present invention. In some embodiments, referring to FIG. 15, the supporting unit 40 can be in either of two states, a locked state and an unlocked state. In the unlocked state, the first element 41 enters the corresponding second element 42 but has not yet been locked with the second element 42. In other words, the first element 41 can still be withdrawn from the second element 42 when the supporting unit 40 is in the unlocked state. In the locked state, the first element 41 enters and locks with the corresponding second element 42, such that the first element 41 cannot be withdrawn from the second element 42. FIG. 11 illustrates the supporting unit 40 in the locked state. The supporting unit 40 can be operated and controlled manually or automatically. The supporting unit 40 can be switched between the two states manually or automatically.

In some embodiments, the first element 41 is rotatably fixed to the extruding system 10. In some embodiments, the first element 41 includes an elongated portion 411 and an arm portion 412. The elongated portion 411 and the arm portion 412 are rotatable in a direction indicated by an arrow A. The elongated portion 411 is fixed to the extruding system 10 and extends in a first direction Z toward the upper mold 32. The arm portion 412 is coupled to the elongated portion 411 and extends in a second direction X substantially orthogonal to the first direction Z or in a third direction Y substantially orthogonal to the first direction Z. In some embodiments, the first element 41 has an inverted T shape. After the first element 41 enters the second element 42, the supporting unit 40 is shifted from the unlocked state to the locked state by rotation of the arm portion 412 of the first element 41. In some embodiments, the first element 41 is locked with the second element 42 by rotating the arm portion 412 of the first element 41 with about 90 degrees. FIG. 14 illustrates the arm portion 412 locked with the second element 42 after rotating the arm portion 412 with about 90 degrees. As a result, the supporting unit 40 is in the locked state, and the discharging channel 20 is tightly engaged with the molding device 30, and thus the injection of the mixture from the extruding system 10 and the discharging channel 20 to the molding device 30 can begin.

Figure 16:
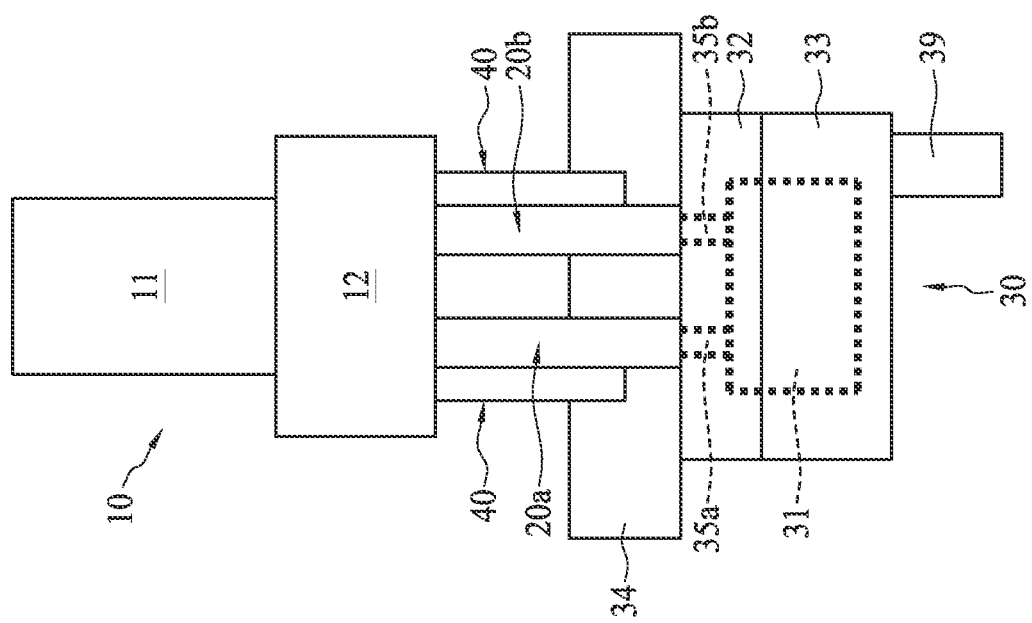
FIG. 16 is a schematic diagram of an injection-molding system according to one embodiment of the present invention.

FIG. 16 is a schematic diagram of an injection-molding system according to one embodiment of the present invention. Referring to FIG. 16, in some embodiments, the molding device 30 of an injection-molding system further includes a sealing element 39 configured to tightly dock the upper mold 32 to the lower mold 33. In some embodiments, the sealing element 39 is disposed below the lower mold 33 and provides a force toward the discharging channels 20a, 20b. In some embodiments, a first force toward the molding device 30 is generated during the injecting of the mixture, and the sealing element 39 provides a second force against the first force. In some embodiments, the sealing element 39 is disposed between the upper mold 32 and the lower mold 33. In some embodiments, the control system 60 controls the sealing element 39 in real time. In some embodiments, a seal ring is disposed between the upper mold 32 and the lower mold 33, or between the upper mold base 34 and the upper mold 32. In some embodiments, the seal ring is disposed around all sides of the molding device 30.

Figure 17:
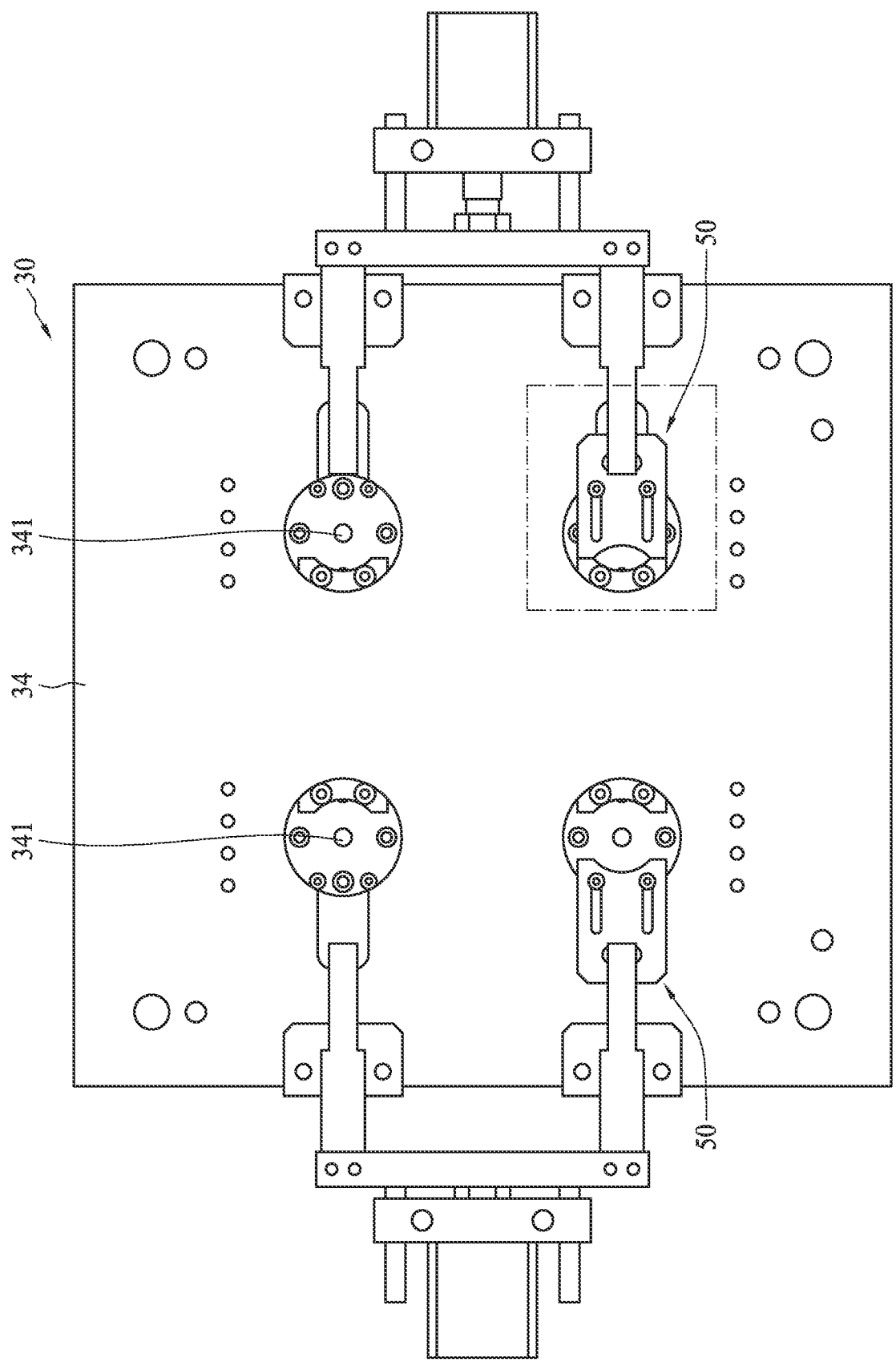
FIG. 17 is a top cross-sectional view of a part of an injection-molding system according to one embodiment of the present invention.
Figure 18:
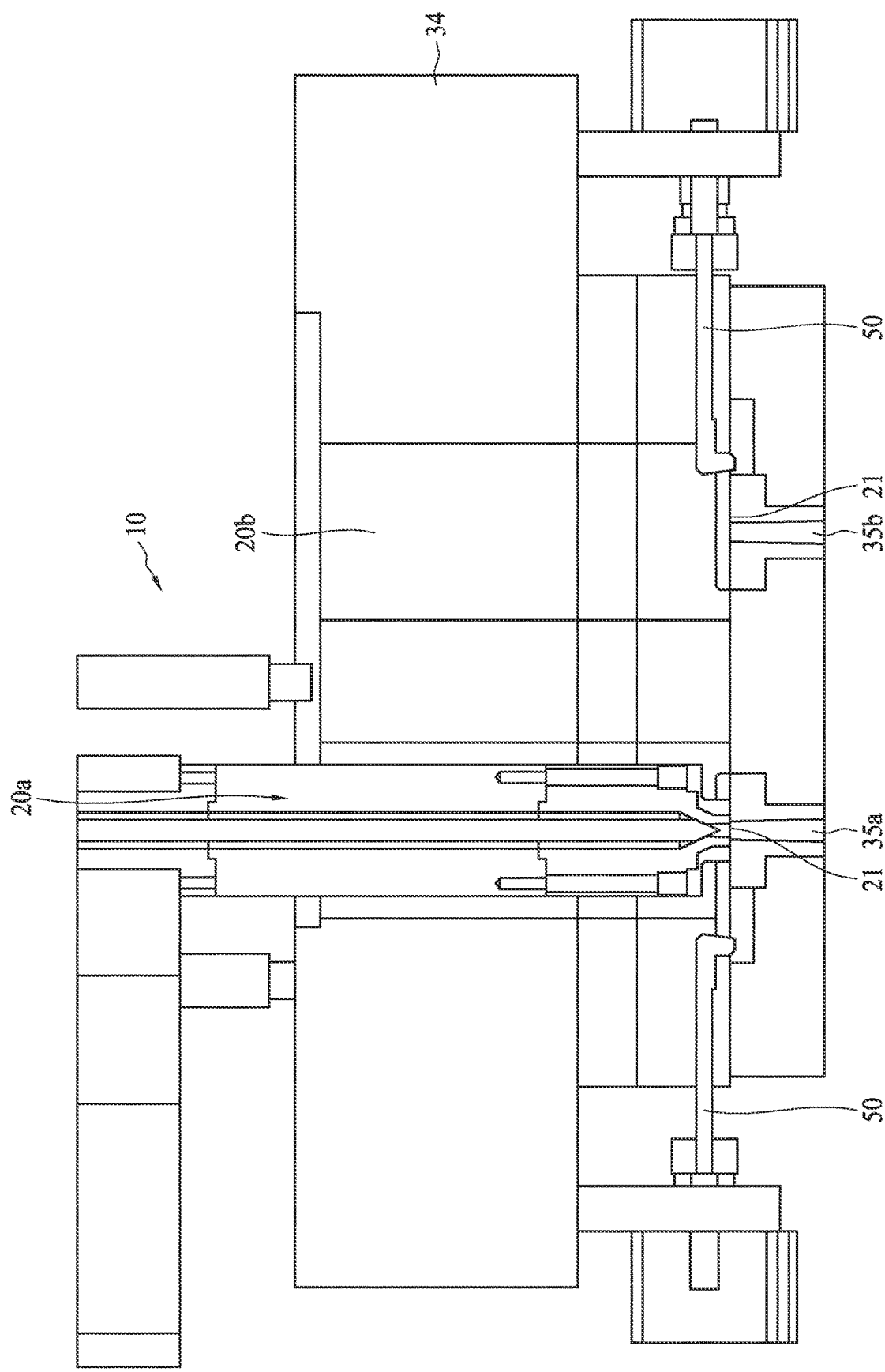
FIG. 18 is a schematic cross-sectional view of a part of an injection-molding system according to one embodiment of the present invention.

FIG. 17 is a top cross-sectional view of a part of the injection-molding system according to one embodiment of the present invention. FIG. 18 is a schematic diagram of a part of the injection-molding system according to one embodiment of the present invention. After injection of the mixture into the molding device 30, the discharging channels 20a, 20b are disengaged from the feeding ports 35a, 35b, at which point the mixture in the molding device 30 may overflow out of the molding device 30 from the feeding ports 35a, 35b and the opening 341. In some embodiments, referring to FIGS. 17 and 18, the injection-molding system further includes a cover 50 configured to prevent the overflow of the mixture. In some embodiments, the cover 50 is configured to stop the mixture from overflowing from the feeding ports 35a, 35b of the upper mold 32. In some embodiments, the cover 50 is configured to cover the feeding ports 35a, 35b of the upper mold 32. In some embodiments, the cover 50 is configured to stop the mixture from overflowing from the feeding ports 35a, 35b of the upper mold 32 and the opening 341 of the upper mold base 34. In some embodiments, the cover 50 is configured to cover the feeding ports 35a, 35b of the upper mold 32 and the opening 341 of the upper mold base 34. In some embodiments, the cover 50 is moved to cover the feeding ports 35a, 35b immediately after the discharging channel 20 is withdrawn from the upper mold base 34.

In some embodiments, the cover 50 is attached to the molding device 30. The cover 50 may be an individual element or module disposed between the molding devices 30 and the discharging channels 20a, 20b. In some embodiments, the cover 50 is attached to the upper mold base 34. The number of covers 50 is not particularly limited. In some embodiments, the number corresponds to the number of the openings 341 of the upper mold base 34 or the number of the feeding ports 35a, 35b.

Figure 19:
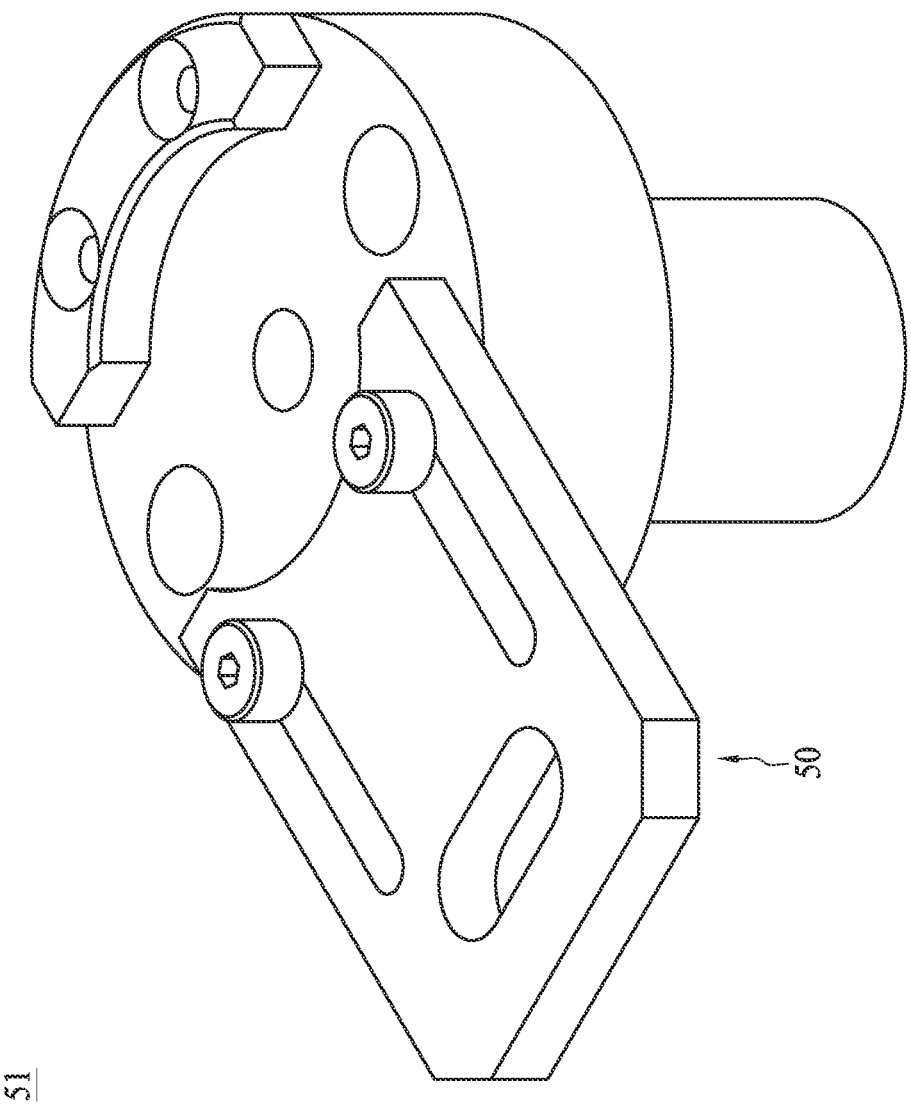
FIG. 19 is a schematic diagram of a cover in an injection-molding system according to one embodiment of the present invention.
Figure 20:
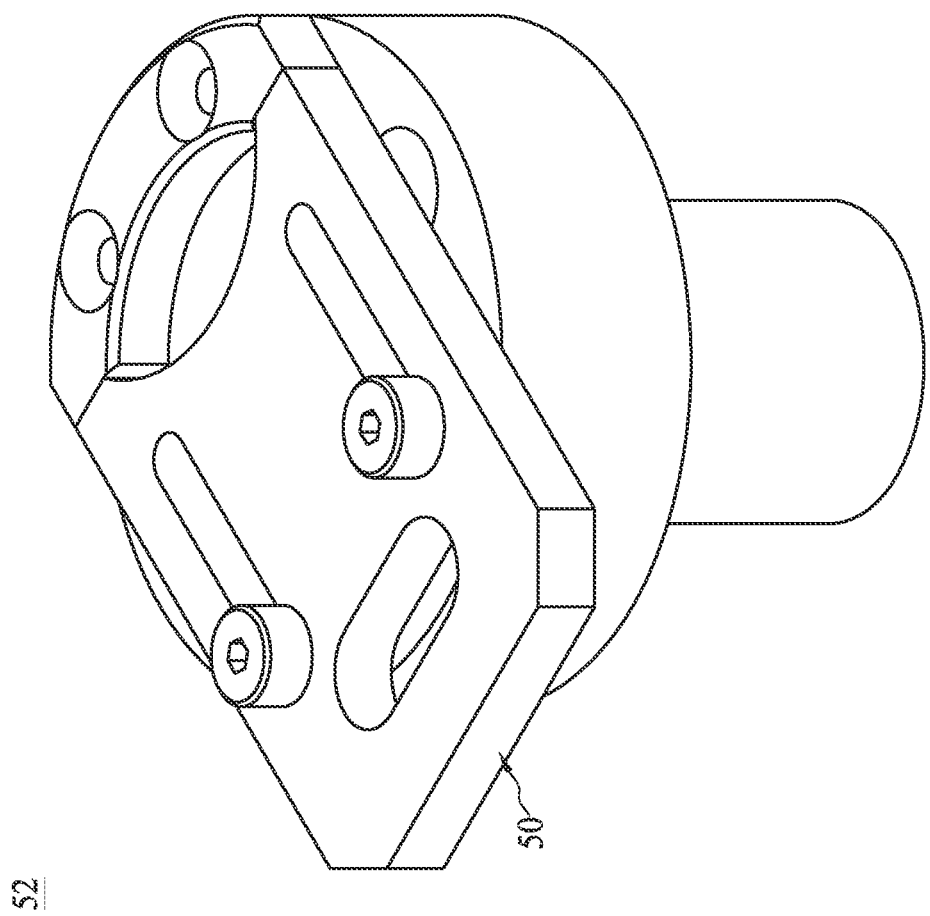
FIG. 20 is a schematic diagram of a cover in an injection-molding system according to one embodiment of the present invention.

FIGS. 19 and 20 are schematic diagrams of the cover 50 in various configurations or states. In some embodiments, referring to FIGS. 19 and 20, the cover 50 is configured to move between a first position 51 and a second position 52. At the first position 51, referring to FIGS. 18 and 19, the cover 50 is away from the opening 341 and the corresponding feeding port 35a, 35b, and the corresponding discharging channel 20a, 20b can engage with the corresponding feeding port 35a, 35b. At the second position 52, referring to FIGS. 17 and 20, the cover 50 covers the corresponding opening 341 and the corresponding feeding port 35a, 35b, and the corresponding discharging channel 20a, 20b cannot engage with the corresponding feeding port 35a, 35b. In some embodiments, the cover 50 can be operated manually or automatically. In some embodiments, movement of the cover 50 can be controlled manually or automatically by the control system 60 in real time. In some embodiments, the cover 50 is moved from the first position 51 to the second position 52 to cover the feeding port 35a, 35b immediately after the discharging channel 20a, 20b is withdrawn from the upper mold base 34.

Figure 21:
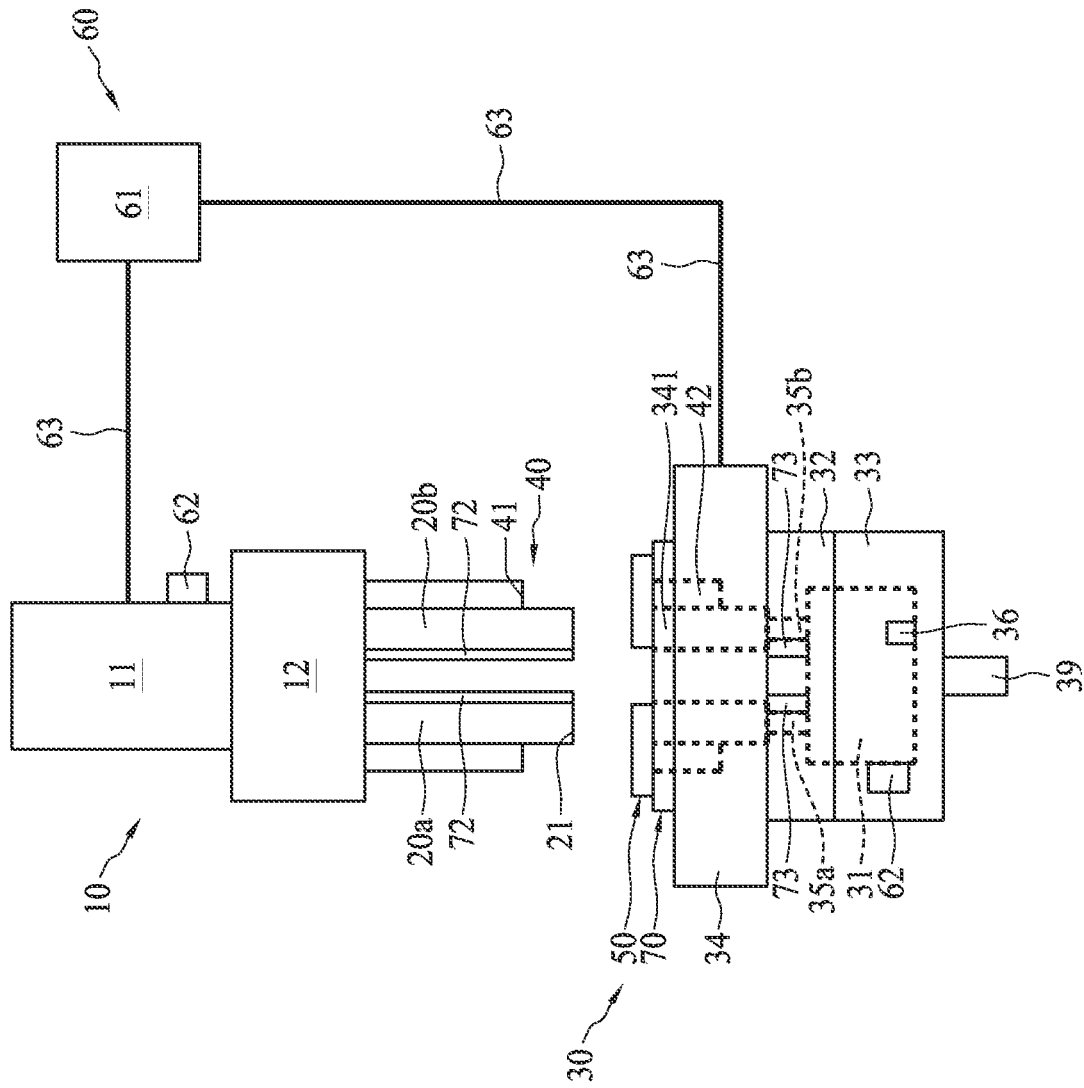
FIG. 21 is a schematic diagram of an injection-molding system according to one embodiment of the present invention.

FIG. 21 is a schematic diagram of an injection-molding system according to one embodiment of the present invention. In some embodiments, referring to FIG. 21, the injection-molding system includes an extruding system 10, a plurality of discharging channels 20a, 20b and a molding device 30. The injection-molding system further includes a supporting device 40, covers 50, a control system 60, an insulator 70, and heaters 72, 73. Each of the molding devices 30 includes a hollow space 31, an upper mold 32, a lower mold 33, an upper mold base 34, and a feeding port 35. The molding device 30 may further include, for example, a sealing element 39, and/or a protrusion 36 as described above or shown in FIGS. 1 and 16.

Figure 22:
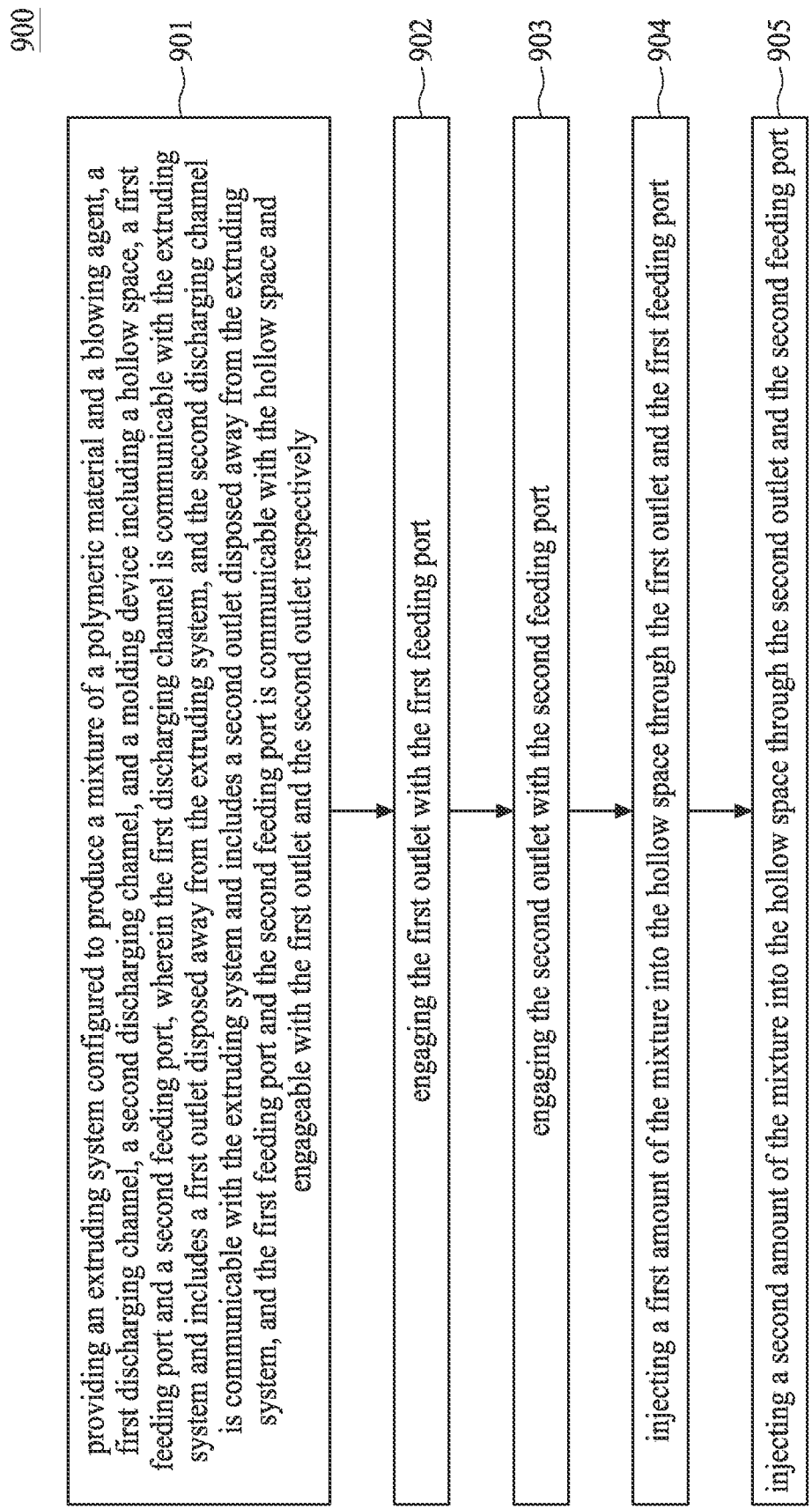
FIG. 22 is a flowchart illustrating an injection mo method according to one embodiment of the present invention.
Figure 23:
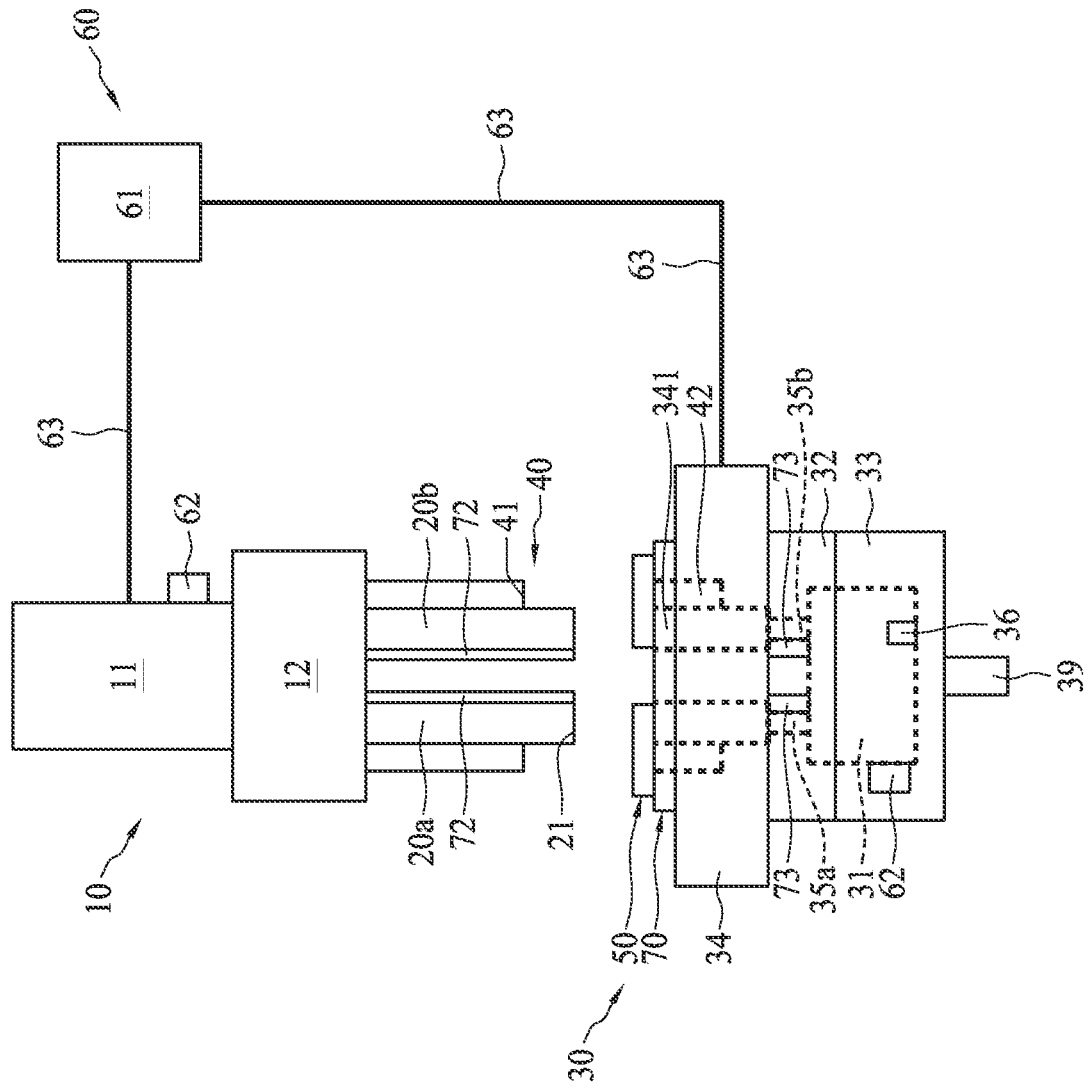
FIGS. 23 to 27 are schematic diagrams illustrating exemplary operations in a method of injection molding according to one embodiment of the present disclosure.

In the present disclosure, an injection molding method is disclosed. The method includes a number of operations and the description and illustrations are not deemed as a limitation of the sequence of the operations. FIG. 22 is a flowchart illustrating an injection molding method according to one embodiment of the present invention. In some embodiments, as shown in FIG. 22, the method of injection molding 900 includes the following steps.

Step 901 includes providing an extruding system configured to produce a mixture of a polymeric material and a blowing agent, a first discharging channel, a second discharging channel, and a molding device including a hollow space, a first feeding port and a second feeding port. The first discharging channel is communicable with the extruding system and includes a first outlet disposed distal from the extruding system, the second discharging channel is communicable with the extruding system and includes a second outlet disposed distal from the extruding system, and the first feeding port and the second feeding port are communicable with the hollow space and engageable with the first outlet and the second outlet, respectively.

Step 902 includes engaging the first outlet with the first feeding port.

Step 903 includes engaging the second outlet with the second feeding port.

Step 904 includes injecting a first amount of the mixture into the hollow space through the first outlet and the first feeding port.

Step 905 includes injecting a second amount of the mixture into the hollow space through the second outlet and the second feeding port.

The method 900 is not limited to the above-mentioned embodiments. In some embodiments, the method of injection molding 900 uses any of the above-mentioned injection-molding systems as shown in FIGS. 1 to 21.

FIGS. 23 to 27 are schematic diagrams illustrating exemplary operations for method of injection molding according to one embodiment of the present disclosure. In some embodiments, referring to FIG. 23, the injection molding method 900 includes step 901, which includes providing an extruding system 10 configured to produce a mixture of a polymer and a blowing agent, a first discharging channel 20a, a second discharging channel 20b, and a molding device 30 including a hollow space 31, a first feeding port 35a and a second feeding port 35b. The first discharging channel 20a is communicable with the extruding system 10 and includes a first outlet 21 disposed distal from the extruding system 10, and the second discharging channel 20b is communicable with the extruding system 10 and includes a second outlet 21 disposed distal from the extruding system 10, and the first feeding port 35a and the second feeding port 35b are communicable with the hollow space 31 and engageable with the first outlet 21 and the second outlet 22, respectively.

In some embodiments, the upper mold 32 is sealed to the corresponding lower mold 33 by the sealing element 39.

In some embodiments, the supporting unit 40 is in an unlocked state. In some embodiments, before the mixture is injected into the hollow space 31, the covers 50 are disposed at the second position 52 to cover the first feeding port 35a and the second feeding port 35b.

In some embodiments, a temperature difference is provided between the first discharging channel 20a and the second discharging channel 20b. In some embodiments, a temperature difference is provided between the molding device 30 and the first and second discharging channels 20a, 20b. In some embodiments, referring to FIG. 23, the heaters 72 disposed on the first and second discharging channels 20a, 20b heat the first and second discharging channels 20a, 20b to predetermined temperatures. In some embodiments, the heaters 73 disposed in the upper mold 32 heat the first feeding port 35a and the second feeding port 35b to predetermined temperatures.

In some embodiments, at the beginning of step 901, the extruding system 10 and the discharging channels 20a, 20b are distal from the molding device 30.

In some embodiments, the method 900 includes step 902, which includes engaging the first outlet 21 of the first discharging channel 20a with the first feeding port 35a.

Figure 24:
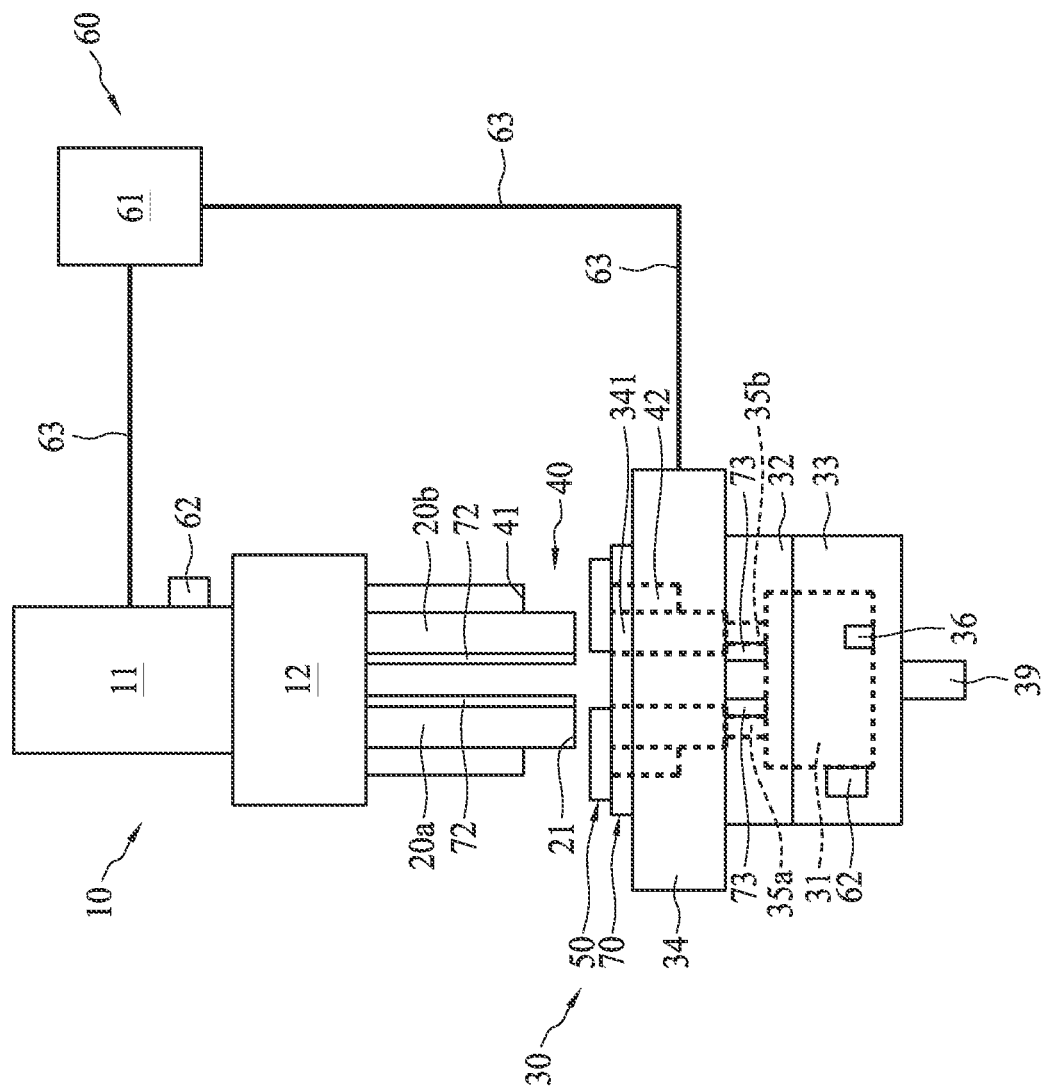

Referring to FIG. 24, before the engagement of the first outlet 21 with the first feeding port 35 of the molding device 30, the method 900 includes moving the first discharging channel 20a and the second discharging channel 20b toward the molding device 30. In some embodiments, the first and second discharging channels 20a, 20b are moved horizontally to the first position above the molding device 30. At the first position, the discharging channels 20a, 20b are aligned with the corresponding openings 341 of the upper mold base 34 of the molding device 30. In some embodiments, a distance between the first outlet 21 and the upper surface of the upper mold base 34 is greater than 0.

In some embodiments, the method 900 includes step 903, which includes engaging the second outlet 21 of the second discharging channel 20b with the second feeding port 35b. In some embodiments, the engagement of the first outlet 21 with the first feeding port 35a and the engagement of the second outlet 21 with the second feeding port 35b are implemented simultaneously.

Figure 25:
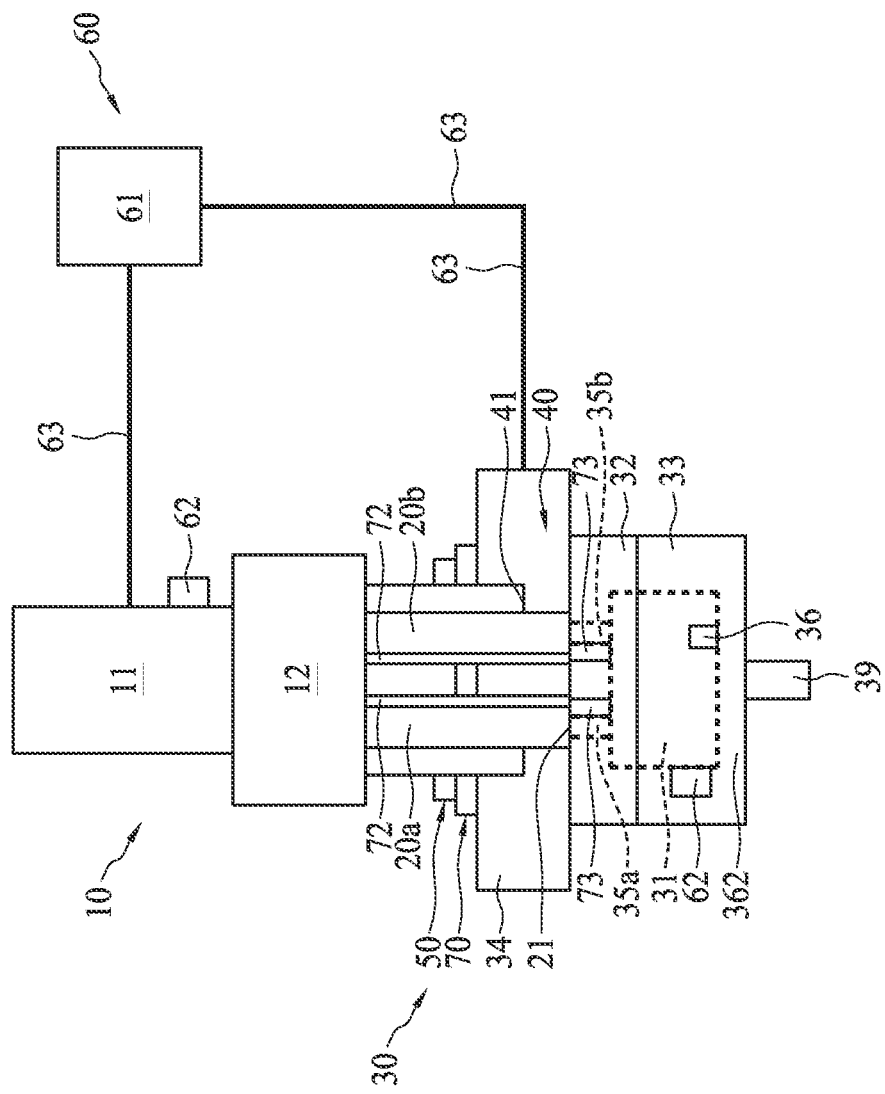

Referring to FIG. 25, after the vertical alignment of the first and second discharging channels 20a, 20b with the corresponding openings 341, the first and second discharging channels 20a, 20b are moved toward the molding device 30 to be received by the corresponding openings 341 of the upper mold base 34, and then the first and second outlets 21 are docked to the corresponding first feeding ports 35a, 35b. In some embodiments, the first and second discharging channels 20a, 20b are moved vertically toward the molding device 30 to be received by the corresponding openings 341 of the upper mold base 34.

After the first outlet 21 is docked to the first feeding ports 35a, the first outlet 21 and the corresponding first feeding port 35a form a flow path of the mixture, such that the discharging channel 20a is communicable with the hollow space 31 through the first feeding port 35a. Similarity, after the second outlet 21 is docked to the second feeding port 35b, the second outlet 21 and the corresponding second feeding port 35*b* form another flow path of the mixture, such that the discharging channel 20*b* is communicable with the hollow space 31 through the second feeding port 35*b*. The outlets 21 must be tightly engaged with the corresponding first and second feeding ports 35*a*, 35*b* in order to prevent the mixture from leaking out of the molding device 30.

In some embodiments, when the mixture is ready to be injected by the extruding system 10, the first and second discharging channels 20*a*, 20*b* are aligned with the molding device 30 and the cover 50 of the molding device 30 is slid from the second position 52 to the first position 51. After the movement of the cover 50 from the second position 52 to the first position 51, the first and second outlets 21 can engage with the corresponding first and second feeding ports 35*a*, 35*b*. After the engagement of the first outlet 21 and the first feeding port 35*a*, and the engagement of the second outlet 21 and the second feeding port 35*b*, the injection begins. The cover 50 remains at the first position 51 during the injection of the mixture.

In some embodiments, the method 900 further includes securing the discharging channels 20*a*, 20*b* to the molding device 30 by shifting the supporting unit 40 to the locked state, such as rotating a first element 41 of the supporting device 40 relative to and within a second element 42 of the supporting device 40 while engaging the outlet 21 with the first feeding port 35*a*. In some embodiments, when the first and second outlets 21 are docked to the first and second feeding ports 35*a*, 35*b*, the first element 41 enters the second element 42 and then locks with the second element 42.

In some embodiments, the heaters 72 heat the first and second discharging channels 20*a*, 20*b* to keep the temperature of the discharging channels 20*a*, 20*b* within predetermined ranges. In some embodiments, the heaters 73 heat the first and second feeding ports 35*a*, 35*b* to maintain the temperature of the first and second feeding ports 35*a*, 35*b* within the predetermined ranges.

Figure 26:
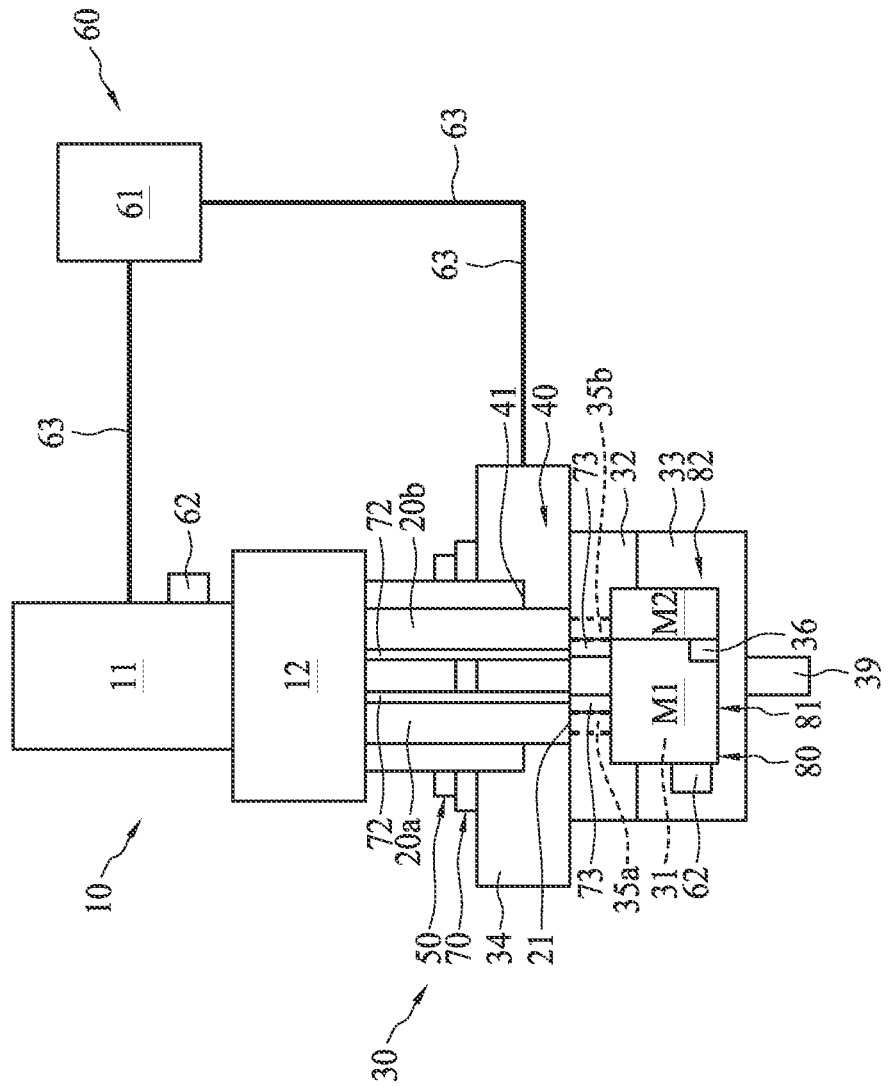
Figure 27:
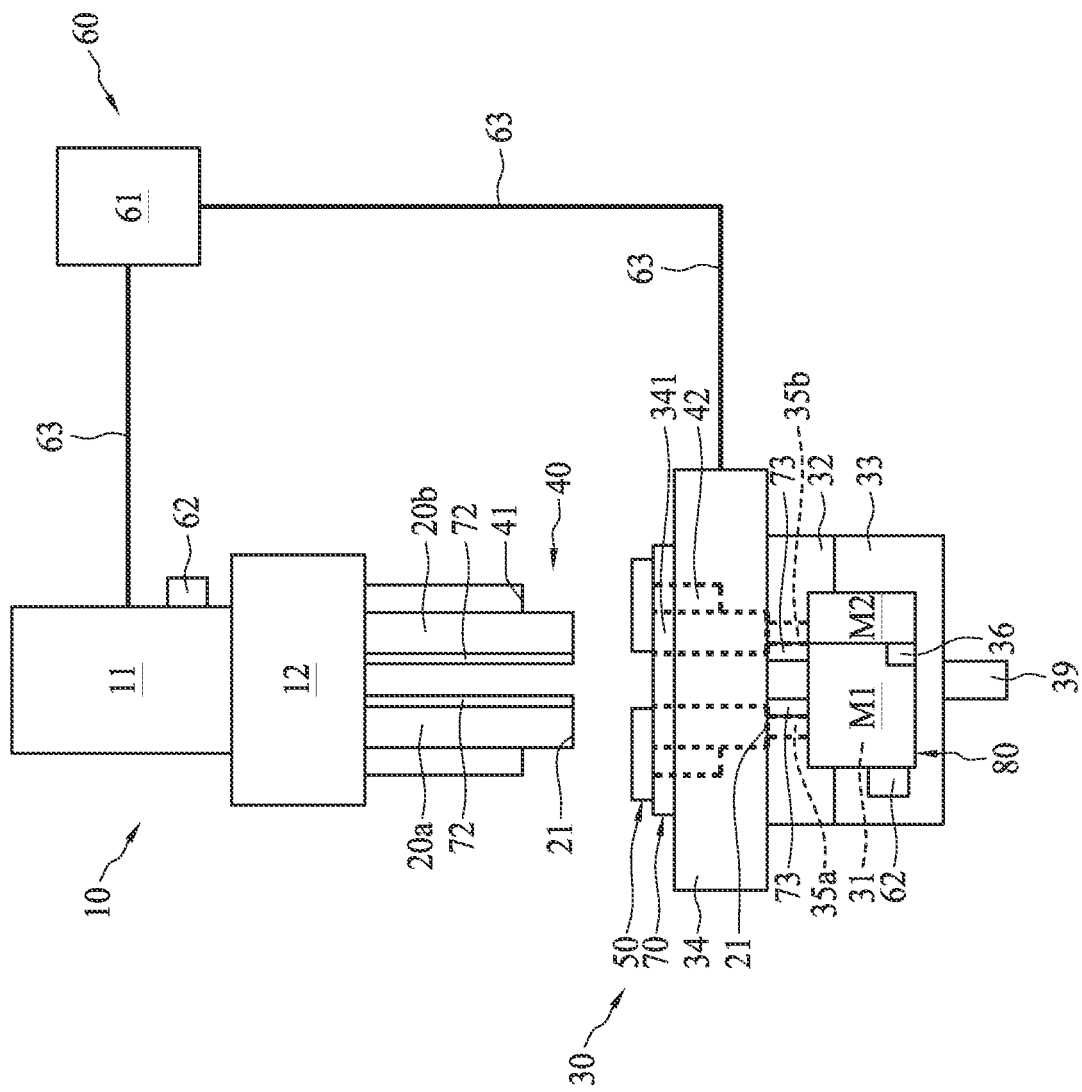

In some embodiments, referring to FIG. 26, the method 900 includes step 904, which includes injecting a first amount of the mixture M1 into the hollow space 31 through the first outlet 21 and the first feeding port 35*a*. In some embodiments, the first discharging channel 20*a* is at least partially surrounded by the molding device 30 during the injection of the first amount of the mixture M1. In some embodiments, the process of injecting the first amount of the mixture M1 into the hollow space 31 lasts only 0.5 to 1 second.

In some embodiments, the method 900 includes step 905, which includes injecting a second amount of the mixture M2 into the hollow space 31 through the second outlet 21 and the second feeding port 35*b*. In some embodiments, the second discharging channel 20*b* is at least partially surrounded by the molding device 30 during the injection of the second amount of the mixture M2. In some embodiments, the process of injecting the second amount of the mixture M2 into the hollow space 31 lasts only 0.5 to 1 second.

In some embodiments, the injection of the first amount of the mixture M1 and the injection of the second amount of the mixture M2 are implemented simultaneously. In some embodiments, a duration for injecting the first amount of the mixture M1 is equal to a duration for injecting the second amount of the mixture M2.

In some embodiments, a force is provided by the supporting device 40 to prevent the separation of the extruding system 10 from the molding device 30. In some embodiments, in step 904 and step 905, when the mixture is injected from the first and second outlets 21 into the molding device 30, the molding device 30 may generate a reaction force opposite to an injection direction, and the reaction force may be transmitted to the first and second discharging channels 20*a*, 20*b* and the extruding system 10, so that the first and second discharging channels 20*a*, 20*b* tend to separate from the molding device 30. In some embodiments, the supporting unit 40 provides support against the reaction force opposite to the injection direction.

In some embodiments, during the process of injection, the temperatures of the first and second discharging channels 20*a*, 20*b* are greater than that of the molding device 30. In some embodiments, the temperature difference is maintained using the insulator 70 and the heaters 72, 73.

In some embodiments, the method 900 further includes forming a foamed article 80 in the hollow space 31 after step 904 and step 905. The foamed article 80 includes a first portion 81 formed by the first amount of the mixture M1 and a second portion 82 formed by the second amount of the mixture M2. In some embodiments, the first portion 81 and the second portion 82 are disposed at the two opposite sides of a groove corresponding to the protrusion 36.

In some embodiments, the foamed article 80 further includes a first mark 84*a* and a second mark 84*b* corresponding to the first feeding port 35*a* and the second feeding port 35*b*, respectively. In some embodiments, the first mark 84*a* is disposed in the first portion 81 and the second mark 84*b* is disposed in the second portion 82.

In some embodiments, the method 900 further includes disengaging the first outlet 21 from the first feeding port 35*a*. In some embodiments, the method further includes disengaging the second outlet 21 from the second feeding port 35*b*. In some embodiments, the disengagement of the first outlet 21 from the first feeding port 35*a* and the disengagement of the second outlet 21 from the second feeding port 35*b* are implemented simultaneously. In some embodiments, after the injection of the first amount and the second amount of the mixtures M1, M2 into the hollow space 31, the first and second discharging channels 20*a*, 20*b* are disengaged from and moved away from the molding device 30.

In some embodiments, before the disengaging of the first outlet 21 from the first feeding port 35*a* and the disengaging of the second outlet 21 from the second feeding port 35*b*, the supporting unit 40 is shifted to the unlocked state. In some embodiments, the supporting unit 40 is shifted from the locked state to the unlocked state by rotating a first element 41 of the supporting device 40 relative to and within a second element 42 of the supporting device 40 to unlock the discharging channel 20 from the molding device 30. In some embodiments, during the disengagement of the first and second outlets 21 from the first and second feeding ports 35*a*, 35*b*, the first element 41 is unlocked from the second element 42 and is then pulled away from the second element 42.

In some embodiments, the method 900 further includes covering the first and second feeding port 35*a*, 35*b* during or after the disengagement of the first and second outlets 21 from the first and second feeding ports 35*a*, 35*b*, respectively. When the first and second outlets 21 are separated from the first and second feeding port 35*a*, 35*b*, each of the covers 50 immediately slides from the first position 51 to the second position 52, so that the mixture in the molding device 30 does not overflow from the first and second feeding ports 35*a*, 35*b*.

In some embodiments, the heaters 73 of the molding device 30 stop heating the first and second feeding ports 35*a*, 35*b* after injecting a first and second amount of mixtures M1, M2 into the hollow space 31. In some embodiments, the heaters 72 keep heating the first and second discharging channels 20a, 20b.

In the above-mentioned Step 901 to Step 905, the control system 60 automatically controls the extruding system 10, the first and second discharging channels 20a, 20b, the molding devices 30, the supporting device 40, the covers 50, the insulator 70, and the heaters 72, 73 in real time. In some embodiments, the control system 60 controls movement of the extruding system 10. In some embodiments, the control system 60 controls movement of the first and second discharging channels 20a, 20b.

The method 900 is not limited to the above-mentioned embodiments. In some embodiments, the method of injection molding 900 uses any of the above-mentioned molding devices as shown in FIGS. 1 to 21.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. An injection molding method, comprising:
providing an extruding system configured to produce a mixture of a polymeric material and a blowing agent, a first discharging channel, a second discharging channel, and a molding device including a hollow space, a first feeding port and a second feeding port,
wherein the first discharging channel is communicable with the extruding system and includes a first outlet disposed distal from the extruding system, the second discharging channel is communicable with the extruding system and includes a second outlet disposed distal from the extruding system, and the first feeding port and the second feeding port are communicable with the hollow space and respectively engageable with the first outlet and the second outlet;
securing at least one of the first discharging channel and the second discharging channel to the molding device by engaging a first element of a supporting device relative to a second element of the supporting device, wherein the first element protrudes from the extruding system, and the second element is disposed on the molding device;
engaging the first outlet with the first feeding port;
engaging the second outlet with the second feeding port;
injecting a first amount of the mixture into the hollow space through the first outlet and the first feeding port; and
injecting a second amount of the mixture into the hollow space through the second outlet and the second feeding port.

2. The method of claim 1, further comprising moving the first discharging channel and the second discharging channel toward the molding device before the engagement of the first outlet with the first feeding port.

3. The method of claim 1, wherein the first discharging channel and the second discharging channel are moved, extended, or retracted synchronously or separately.

4. The method of claim 1, wherein the first element enters the second element and then locks with the second element.

5. The method of claim 1, wherein a force is provided by the supporting device after the engagement to prevent the first discharging channel or the second discharging channel separating from the molding device.

6. The method of claim 1, wherein the engagement of the first element to the second element includes rotating the first element relative to and within the second element.

7. The method of claim 6, wherein the at least one of the first discharging channel and the second discharging channel is secured to the molding device by rotating an elongated portion and an arm portion of the first element of the supporting device, the elongated portion is fixed to the extruding system and extends in a first direction toward the molding device, and the arm portion is coupled to the elongated portion and extends in a second direction different from the first direction.

8. The method of claim 7, wherein the second direction is substantially orthogonal to the first direction.

9. The method of claim 1, wherein the engagement of the first outlet with the first feeding port and the engagement of the second outlet with the second feeding port are implemented simultaneously.

10. The method of claim 1, wherein the injection of the first amount of the mixture and the injection of the second amount of the mixture are implemented simultaneously.

11. The method of claim 1, wherein a duration for injecting the first amount of the mixture is equal to a duration for injecting the second amount of the mixture.

12. The method of claim 1, further comprising forming a foamed article in the hollow space, wherein the foamed article includes a first mark and a second mark corresponding to the first feeding port and the second feeding port, respectively.

13. The method of claim 1, wherein the first amount of the mixture is different from the second amount of the mixture.

14. The method of claim 1, further comprising extending the first discharging channel into the molding device to at least partially surround the first discharging channel by the molding device during the injection of the first amount of the mixture.

15. The method of claim 1, wherein the injection of the first amount of the mixture into the hollow space lasts for 0.5 to 1 second.

16. The method of claim 1, further comprising covering the first feeding port after the first amount of the mixture is injected into the hollow space through the first outlet and the first feeding port and retracting the first discharging channel from the molding device.

17. The method of claim 1, wherein a temperature of the first discharging channel is greater than a temperature of the molding device, and a temperature of the second discharging channel is substantially greater than the temperature of the molding device.

18. The method of claim 17, further comprising disposing an insulator over the molding device to separate the first discharging channel from the molding device and separate the second discharging channel from the molding device.

19. The method of claim 18, wherein the first discharging channel and the second discharging channel are partially surrounded by the insulator after the first outlet is engaged with the first feeding port and the second outlet is engaged with the second feeding port.

20. The method of claim 18, wherein the insulator is disposed between the first discharging channel and the molding device, or between the second discharging channel and the molding device.

* * * * *